(12) United States Patent
Hoenke et al.

(10) Patent No.: US 7,710,555 B2
(45) Date of Patent: May 4, 2010

(54) APPARATUS AND METHOD FOR DETERMINING THE ORIENTATION OF AN OBJECT SUCH AS VEHICLE WHEEL ALIGNMENT

(75) Inventors: Mark S. Hoenke, Grand Rapids, MI (US); Jack A. Hulbert, Shelbyville, MI (US); James R. Lehman, Potterville, MI (US); Todd K. Menkveld, Grand Rapids, MI (US); Gregory J. Momber, Grand Rapids, MI (US); Thomas D. Smith, Grand Rapids, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 385 days.

(21) Appl. No.: 11/768,444

(22) Filed: Jun. 26, 2007

(65) Prior Publication Data
US 2008/0007016 A1    Jan. 10, 2008

Related U.S. Application Data

(60) Provisional application No. 60/816,735, filed on Jun. 27, 2006.

(51) Int. Cl.
*G01B 11/26* (2006.01)
(52) U.S. Cl. ............... 356/155; 356/139.09; 33/286; 33/288
(58) Field of Classification Search ........... 356/155, 356/139.01, 141.1, 141.2; 33/203, 286, 288
See application file for complete search history.

(56) References Cited

U.S. PATENT DOCUMENTS 3,630,623 A    12/1971    Schirmer (Continued)

FOREIGN PATENT DOCUMENTS

DE    2948573 A1    12/1979

(Continued)

OTHER PUBLICATIONS

International Search Report of corresponding PCT application No. PCT/US07/72227.

(Continued)

*Primary Examiner*—L. G Lauchman
(74) *Attorney, Agent, or Firm*—Van Dyke, Gardner, Linn & Burkhart, LLP

(57) ABSTRACT

An apparatus for determining wheel assembly alignment comprises a contact assembly, a light source, and a light beam receiving assembly. The contact assembly engages the wheel assembly to define a plane of orientation of the wheel assembly and the light source projects a beam of light with respect to the contact assembly. The light beam receiving assembly receives the light beam and forms an image of the light beam indicating the orientation of the wheel assembly with respect to a predetermined position. The receiving assembly may include a Fresnel lens for directing the received light beam to a target and a camera device for imaging the light beam on the target, with the camera device adapted to provide toe and camber information of the wheel assembly based on the location at which the light beam impinges upon the target. The contact assembly may be pressed against the wheel assembly without being secured thereto.

23 Claims, 22 Drawing Sheets

U.S. PATENT DOCUMENTS

| | | | |
|---|---|---|---|
| 4,647,208 A | 3/1987 | Bierman | |
| 4,690,557 A | 9/1987 | Wiklund | |
| 4,724,480 A | 2/1988 | Hecker et al. | |
| 4,863,266 A | 9/1989 | Masuko et al. | |
| RE33,144 E | 1/1990 | Hunter et al. | |
| 4,899,218 A | 2/1990 | Waldecker et al. | |
| 4,931,964 A | 6/1990 | Titsworth et al. | |
| 5,018,853 A | 5/1991 | Hechel et al. | |
| 5,044,746 A | 9/1991 | Henseli | |
| 5,048,954 A | 9/1991 | Madey et al. | |
| 5,054,918 A | 10/1991 | Downing et al. | |
| 5,177,558 A | 1/1993 | Hill | |
| 5,198,877 A | 3/1993 | Schulz | |
| 5,249,364 A | 10/1993 | Bishop | |
| 5,268,731 A | 12/1993 | Fuchiwaki et al. | |
| 5,274,433 A | 12/1993 | Madey et al. | |
| 5,291,264 A | 3/1994 | Longa et al. | |
| 5,519,489 A | 5/1996 | McClenahan et al. | |
| 5,532,816 A | 7/1996 | Spann et al. | |
| 5,583,797 A | 12/1996 | Fluegge et al. | |
| 5,675,408 A | 10/1997 | Samuelsson et al. | |
| 5,703,796 A | 12/1997 | Moradi et al. | |
| 5,724,129 A | 3/1998 | Matteucci | |
| 5,724,743 A | 3/1998 | Jackson | |
| 5,731,870 A | 3/1998 | Bartko et al. | |
| 5,781,286 A | 7/1998 | Knestel | |
| 5,812,256 A | 9/1998 | Chapin et al. | |
| 5,815,257 A | 9/1998 | Haas | |
| 5,818,574 A | 10/1998 | Jones et al. | |
| 5,870,315 A | 2/1999 | January | |
| 5,930,881 A | 8/1999 | Naruse et al. | |
| 5,978,077 A | 11/1999 | Koerner et al. | |
| 6,100,923 A | 8/2000 | Sass et al. | |
| 6,148,528 A | 11/2000 | Jackson | |
| 6,400,451 B1 | 6/2002 | Fukuda et al. | |
| 6,404,486 B1 | 6/2002 | Nobis et al. | |
| 6,412,183 B1 | 7/2002 | Uno | |
| 6,424,411 B1 | 7/2002 | Rapidel et al. | |
| 6,456,372 B1 | 9/2002 | Hudy | |
| 6,473,978 B1 | 11/2002 | Maas | |
| 6,545,750 B2 | 4/2003 | Roth et al. | |
| 6,559,936 B1 | 5/2003 | Colombo et al. | |
| 6,657,711 B1 | 12/2003 | Kitagawa et al. | |
| 6,690,456 B2 | 2/2004 | Bux et al. | |
| 6,714,291 B2 | 3/2004 | Castagnoli et al. | |
| 6,731,382 B2 | 5/2004 | Jackson et al. | |
| 6,744,497 B2 | 6/2004 | Burns, Jr. | |
| 6,748,796 B1 | 6/2004 | Van Den Bossche | |
| 6,796,035 B2 | 9/2004 | Jahn et al. | |
| 6,802,130 B2 | 10/2004 | Podbielski et al. | |
| 6,836,970 B2 | 1/2005 | Hirano | |
| 6,879,403 B2 | 4/2005 | Freifeld | |
| 2005/0030525 A1 | 2/2005 | Forster et al. | |

FOREIGN PATENT DOCUMENTS

| | | |
|---|---|---|
| EP | 0593066 A1 | 10/1993 |
| EP | 0593067 A1 | 10/1993 |
| EP | 0994329 A1 | 10/1998 |
| EP | 1221584 A1 | 1/2001 |
| EP | 1505363 A1 | 7/2004 |

OTHER PUBLICATIONS

Written Opinion of the International Searching Authority of corresponding PCT application No. PCT/US07/72227.

APPARATUS AND METHOD FOR DETERMINING THE ORIENTATION OF AN OBJECT SUCH AS VEHICLE WHEEL ALIGNMENT

CROSS REFERENCE TO RELATED APPLICATION

The present application claims priority of U.S. provisional application, Ser. No. 60/816,735 filed Jun. 27, 2006, by Lehman et al. for APPARATUS AND METHOD FOR DETERMINING THE ORIENTATION OF AN OBJECT SUCH AS VEHICLE WHEEL ALIGNMENT, which is hereby incorporated herein by reference in its entirety.

FIELD OF THE INVENTION

This invention relates to measurement systems for determining the orientation of a three-dimensional object with respect to a reference system, and more particularly, to a measurement system especially adapted for use with vehicle wheels using a light beam directed from a contact assembly that engages the object or vehicle wheel to define a plane of orientation for the object or wheel to a target with a lens thereby indicating the location of the light beam on the target and, thus, the orientation of the object or wheel with respect to a predetermined position such as the vehicle centerline.

BACKGROUND OF THE INVENTION

In the automotive industry, proper vehicle quality requires measurement and adjustment of wheel alignment settings, both during manufacture and subsequently during the useful life of the vehicle. Proper positioning and alignment of vehicle wheels, and especially steerable wheels such as the front wheels of a vehicle, requires the setting of toe, camber angle, and caster angle. Toe is the angle between the vehicle's longitudinal axis and a plane through the center of the wheel/tire and affects the straight-ahead running of the vehicle as well as steering. Camber angle is the inclination of the wheel axis toward the road surface in a vertical. Caster angle influences lateral control, is typically moderately negative, and is the distance between the contact point of the wheel/tire with the road and the point at which the steering axis intersects the road as viewed from the side of the wheel. During assembly and/or repair of vehicles, it is important to measure, adjust or audit, and set the toe as well as the camber and caster angles of vehicle wheels, and especially steerable wheels, so the vehicle will drive and steer properly.

In the past, various methods have been used to measure toe and camber of vehicle wheels including direct and indirect methods. Direct measurement methods require human operators or mechanisms to place or mount measurement tools in contact with or to the vehicle and are subject to placement error and wear. Indirect measurement methods, sometimes referred to as noncontact methods, typically include the viewing or sensing of the image of light projected on a tire and the use of a computer to calculate the tire position from such images to provide the ultimate alignment information. While the prior known direct measurement methods were cumbersome, time-consuming, often labor-intensive, and less accurate than desired, the noncontact or indirect methods often required precisely located, relatively complex light and therefore expensive projectors as well as highly sophisticated calculation methods to determine the wheel and tire position.

Therefore, a need was determined for an apparatus and method for measuring and determining the orientation of a vehicle wheel and, more broadly, any three-dimensional object, which would allow rapid, accurate determination of the plane of the wheel or object in an efficient and less expensive manner to indicate the position of the wheel/tire with respect to the vehicle center line for purposes of setting the toe and/or camber of the wheel/tire for alignment purposes.

SUMMARY OF THE INVENTION

Accordingly, the present invention provides an apparatus and method for determining the orientation of a three-dimensional object and, in a preferred embodiment, the position of a vehicle wheel using a contact assembly for engaging the object or vehicle wheel to define a plane of orientation of the object or wheel and a light source projecting a light beam directed from the contact assembly to a receiving assembly wherein the orientation of the light beam in the receiving assembly provides orientation or alignment information of the vehicle tire and wheel assembly. In one embodiment the light receiving assembly includes a lens directing the light beam to a target that indicates the location of the light beam with respect to a predetermined position such as the vehicle center line. A camera positioned within the receiving assembly may view the target with the light beam projected thereon and provide an image thereof that may subsequently be used to properly adjust the orientation of the tire and wheel assembly, or translate the viewed image based on the image location to toe and/or camber values.

According to an aspect of the present invention, an apparatus for determining the orientation of a wheel assembly having a tire mounted on a wheel rim secured for rotation on an axle of a vehicle comprises a contact assembly, a light source, and a light beam receiving assembly. The contact assembly engages the wheel assembly by pressing against the wheel assembly without being secured thereto to define a plane of orientation of the wheel assembly and the light source projects a beam of light with respect to the contact assembly. The light beam receiving assembly receives the light beam and forms an image of the light beam indicating the orientation of the wheel assembly with respect to a predetermined position. The light beam is directed from the contact assembly to the receiving assembly, which includes a target and a lens. The lens is adapted to direct the light beam to the target, wherein the location at which the light beam impinges upon the target is indicative of the planar orientation of the wheel assembly.

In one embodiment the contact assembly includes a plurality of contact members that engage the wheel assembly at a plurality of spaced areas on the wheel assembly, each contact member being mounted on a support and adapted to engage the sidewall of the tire while the wheel assembly is rotating on the axle such that the light beam forms an image of the orientation of the wheel assembly on the target. The apparatus may include a positioning assembly having a mount to which the contact assembly is secured using a pivot. A locating assembly is used to move the contact assembly relative to the wheel assembly for selectively engaging and disengaging the contact members with the wheel assembly. The light source may be a laser or other collimated or structured light beam producing device and may be mounted on the contact assembly. Alternatively, the light source may project at the contact assembly, with the projected light beam being reflected from the contact assembly.

Multiple such apparatuses may be employed with a vehicle of the type having four wheels including a pair of front wheels and a pair of rear wheels; wherein a pair of the apparatuses are positioned adjacent at least one of (a) the front wheels and (b)

the rear wheels, and wherein each apparatus includes a centering roller for positioning the vehicle relative to the apparatuses. An alignment measurement apparatus at each of the front wheels facilitates alignment of the front wheels with respect to each other and the vehicle and an alignment measurement apparatus at each of the rear wheels facilitates alignment of the rear wheels with respect to each other and the vehicle. An alignment apparatus at each of the four wheels facilitates alignment of the front and rear wheels.

In another form, the measurement apparatus includes a second contact assembly for engaging a second wheel assembly of the vehicle to define a plane of orientation of the second wheel assembly and a second light source for projecting a second beam of light with respect to the second contact assembly. In such embodiment, the light beam receiving assembly is adapted to receive both light beams and form images of both light beams on the target that are indicative of the planar orientation of both wheel assemblies. A reflector member may redirect the light beam directed from the contact assembly toward the light receiving assembly.

In yet another embodiment, a light beam receiving assembly is further adapted to receive a projected light beam from a headlamp of the vehicle. The light beam receiving assembly may then also be used to align the headlamp by forming an image of the headlamp light beam on the target with the location at which the headlamp light beam impinges upon the target being indicative of the alignment of the headlamp. The same light beam receiving assembly may be placed in a first position for receiving the light beam with respect to the contact assembly and then placed in a second position for receiving the headlamp light beam.

According to another aspect of the present invention, an apparatus for determining the orientation of a wheel assembly having a tire mounted on a wheel rim secured for rotation on an axle of a vehicle comprises a contact assembly, a light source for projecting a beam of light with respect to the contact assembly, and a light beam receiving assembly. The contact assembly engages the wheel assembly to define a plane of orientation of the wheel assembly with the light beam receiving assembly receiving the light beam and forming an image of the light beam indicating the orientation of the wheel assembly with respect to a predetermined position. The light beam is directed from the contact assembly to the receiving assembly, which includes a target and a Fresnel lens adapted to direct the light beam to the target. The light beam receiving assembly further includes a camera device for imaging the target, with the camera device adapted to provide toe and camber information of the wheel assembly based on the location at which the light beam impinges upon the target.

According to yet another aspect of the present invention, a method for determining the alignment position of a vehicle wheel comprises engaging the wheel with a contact assembly to define a plane of orientation of the wheel, projecting a beam of light with respect to the contact assembly, and receiving the light beam and forming an image of the light beam with a receiving assembly, including directing the light beam from the contact assembly to the receiving assembly, and directing the light beam to a target with a lens. The method further includes determining the orientation of the wheel with respect to the vehicle centerline based on the impingement location of the light beam on the target. In particular embodiments the lens is a Fresnel lens.

The method may further include imaging the impingement of the light beam on the target with a camera device and providing information indicative of the planar orientation of the wheel with the camera device.

The method may also include projecting a light beam from a headlamp, receiving the headlamp light beam with the receiving assembly, and determining the alignment of the headlamp with respect to the vehicle. Such a method may further include positioning the receiving assembly in a first position to receive the light beam projected with respect to the contact assembly, and positioning the receiving assembly in a second position to receive the headlamp light beam projected from a headlamp.

Another aspect of the method includes engaging a second wheel with a second contact assembly to define a plane of orientation of the second wheel, projecting a second beam of light with respect to the second contact assembly, and receiving the second light beam and forming an image of the second light beam with the receiving assembly. Including directing the second light beam from the second contact assembly to the same receiving assembly, and directing the second light beam to the target with the lens. As well as determining the orientation of both wheels with respect to the vehicle centerline based on the impingement locations of the light beams on the target.

The present invention provides significant advantages over prior known apparatus and methods for measuring and calculating the orientation of three-dimensional objects such as vehicle wheels for alignment purposes. The alignment measurement apparatus allows rapid and efficient contact with the object such as the rotating vehicle wheel/tire without precise alignment of the center of the contact assembly with the vehicle axle, and is adapted to fit various sizes of vehicle wheels and tires. When directed to the receiving assembly, the light beam provides a direct indication of the plane of the vehicle tire and wheel assembly. The light beam may be projected on a target, with the impingement of the light beam on the target being representative or indicative of the plane of the object or vehicle tire and wheel assembly and, thus, a direct indication of the toe and camber settings for the wheel and tire. The image on the target may be viewed by an image sensor or light detector such as a charge-coupled device (CCD) camera to translate the image into toe and camber values of the wheel assembly and allow adjustment and setting of the object position such as the alignment of the vehicle wheel. The image may be viewed directly or may be analyzed using software. Caster may be obtained using the toe and camber information generated by the alignment measurement apparatus by angularly turning the wheel and tire assembly while monitoring the camber versus the toe. The apparatus and method allow rapid determination of the position of the wheel/tire with minimal operator labor using an apparatus that is less costly to manufacture and use. These and other objects, advantages, purposes, and features of the invention will become more apparent from a study of the following description taken in conjunction with the drawings.

DESCRIPTION OF THE PREFERRED EMBODIMENTS

The present invention will now be described with reference to the accompanying figures, wherein the numbered elements in the following written description correspond to like-numbered elements in the figures. An apparatus for determining the orientation of an object such as a vehicle wheel is shown at 30 in FIGS. 1-3, with a wheel alignment measurement apparatus 30 in operational relation to each of the wheels 32 of vehicle 34. Wheel alignment measurement apparatuses 30 are used to measure the orientation of wheels 32 for adjusting the proper toe and camber of wheels 32 with respect to the vehicle 34 and/or the centerline of the vehicle 34. In the illustrated embodiment, vehicle 34 is a truck, such as a four-wheel drive truck, and apparatuses 30 are used to adjust the toe and/or camber of each of the wheels 32 with respect to the vehicle's centerline.

Figure 1:
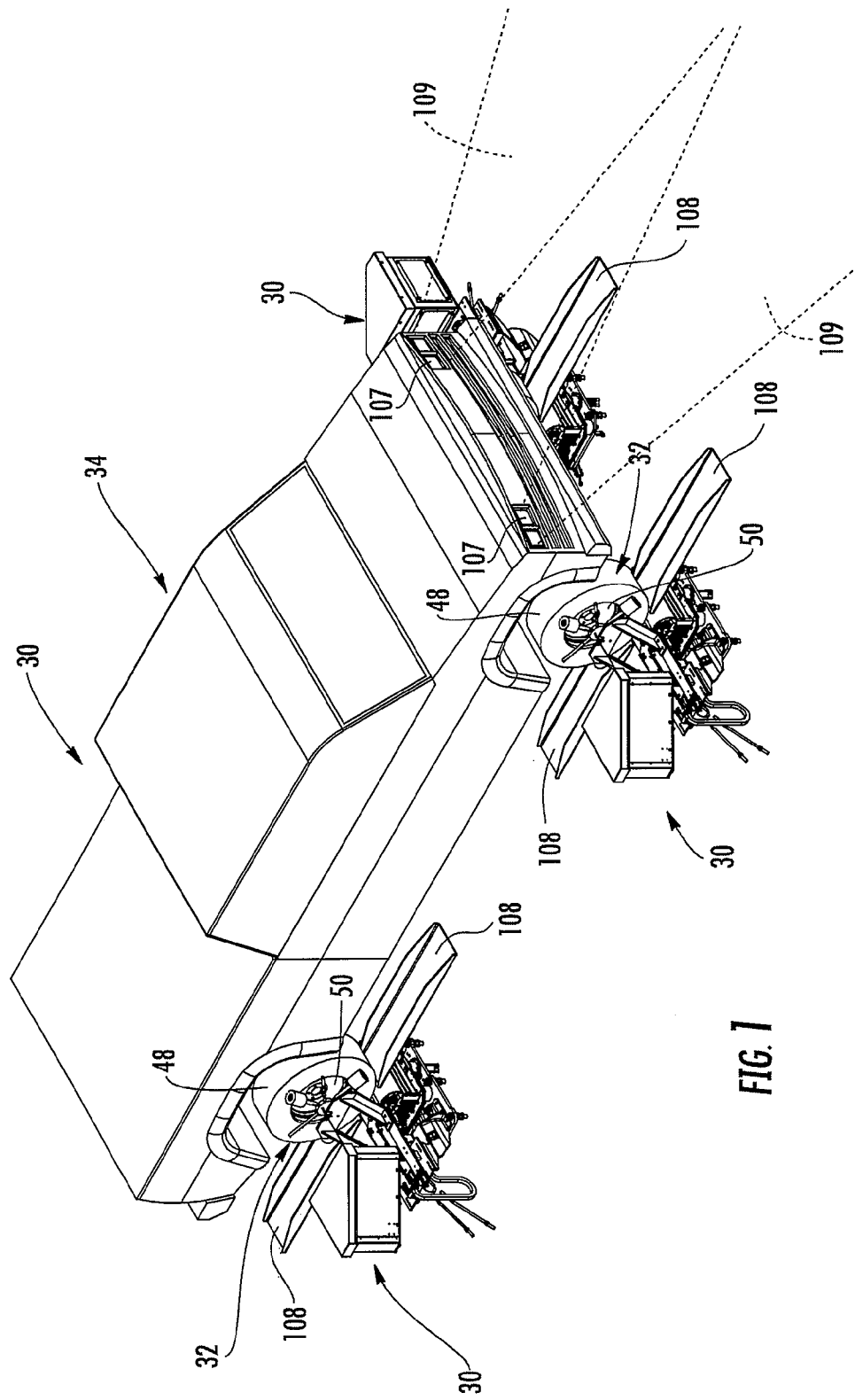
FIG. 1 is a perspective view of a vehicle positioned on a four wheel alignment measurement apparatuses in accordance with the present invention.
Figure 1A:
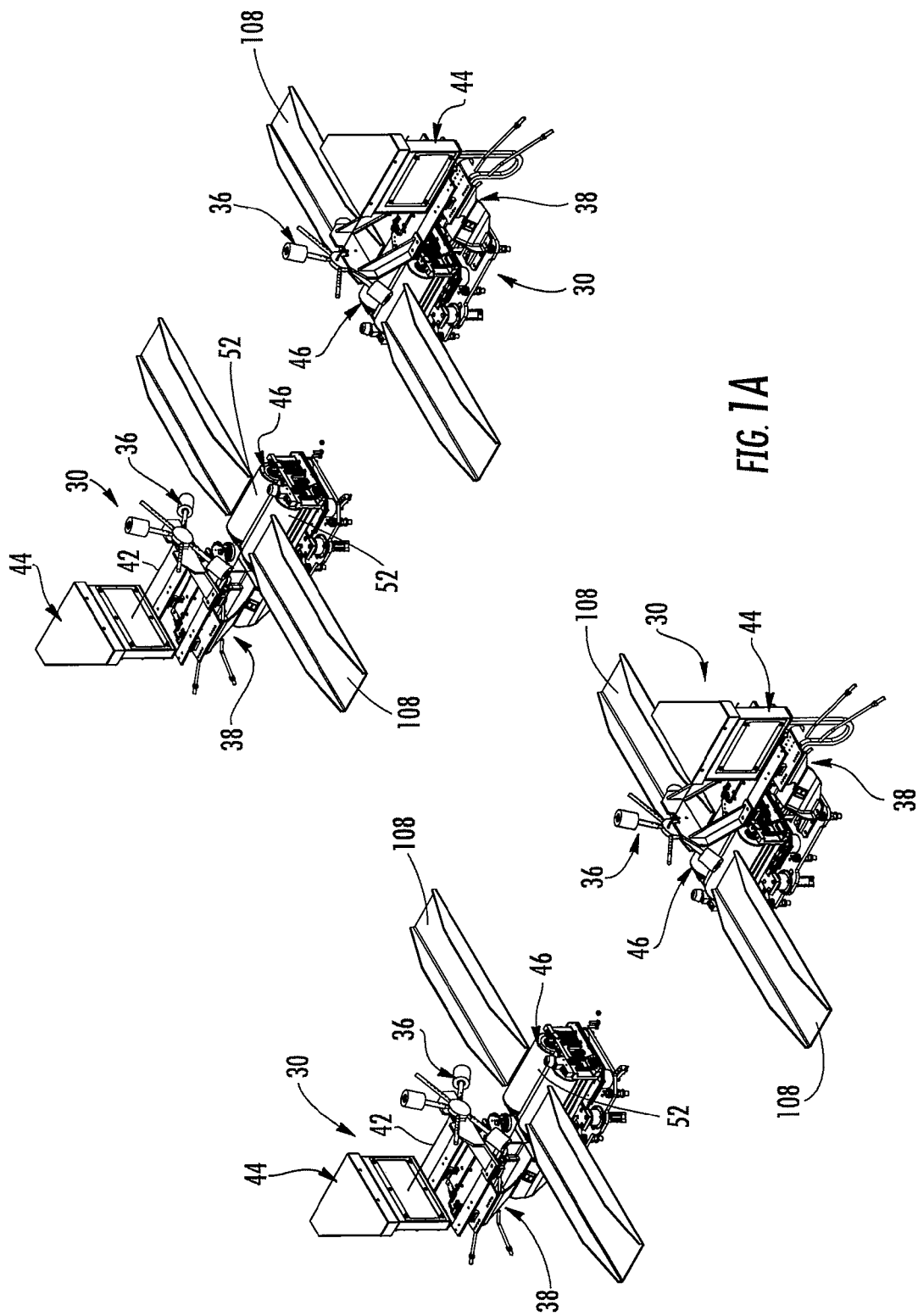
FIG. 1A is a perspective view of the four wheel alignment measurement apparatuses of FIG. 1 with the vehicle removed.
Figure 2:
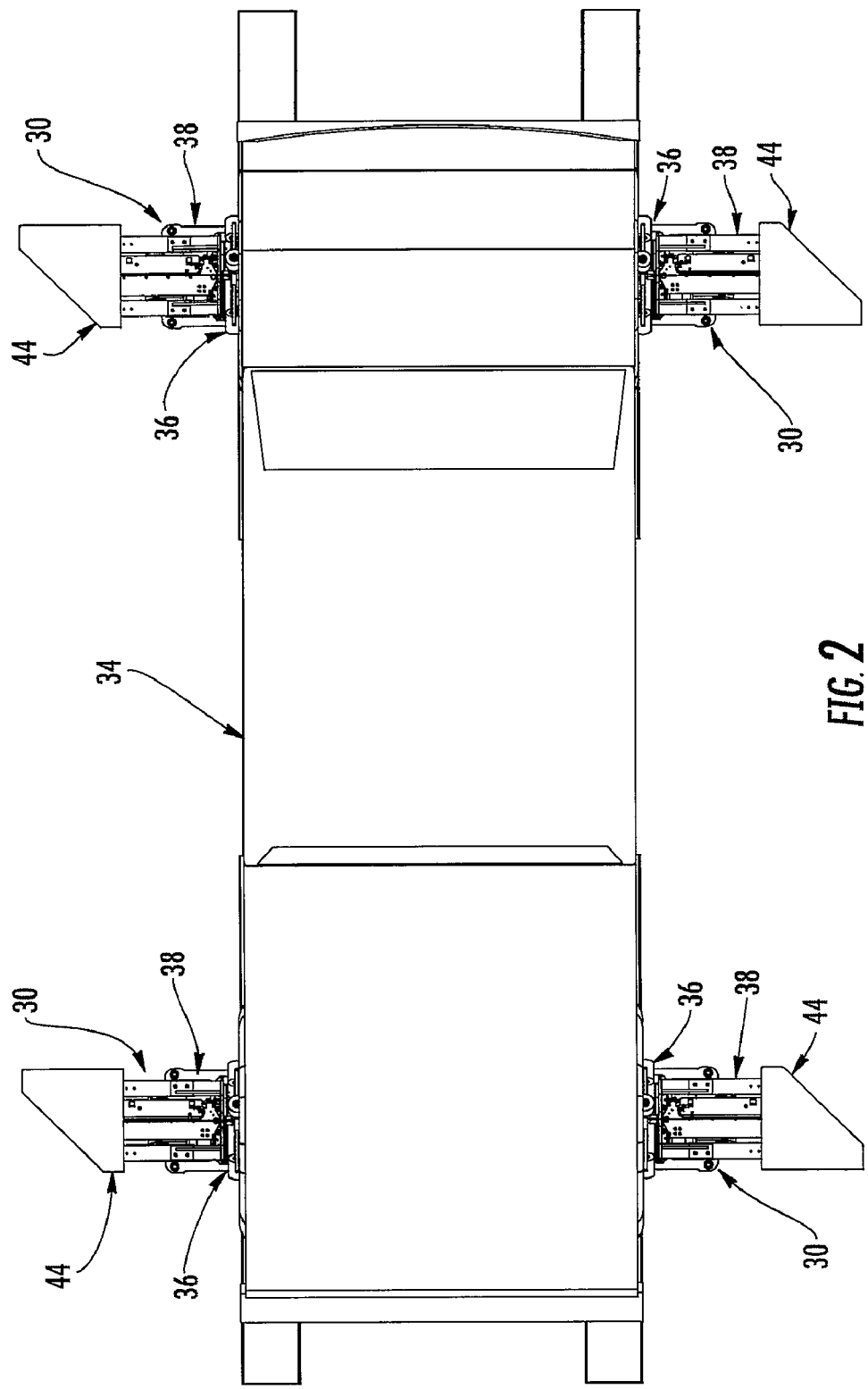
FIG. 2 is a top plan view of the truck and wheel alignment measurement apparatuses of FIG. 1.
Figure 3:
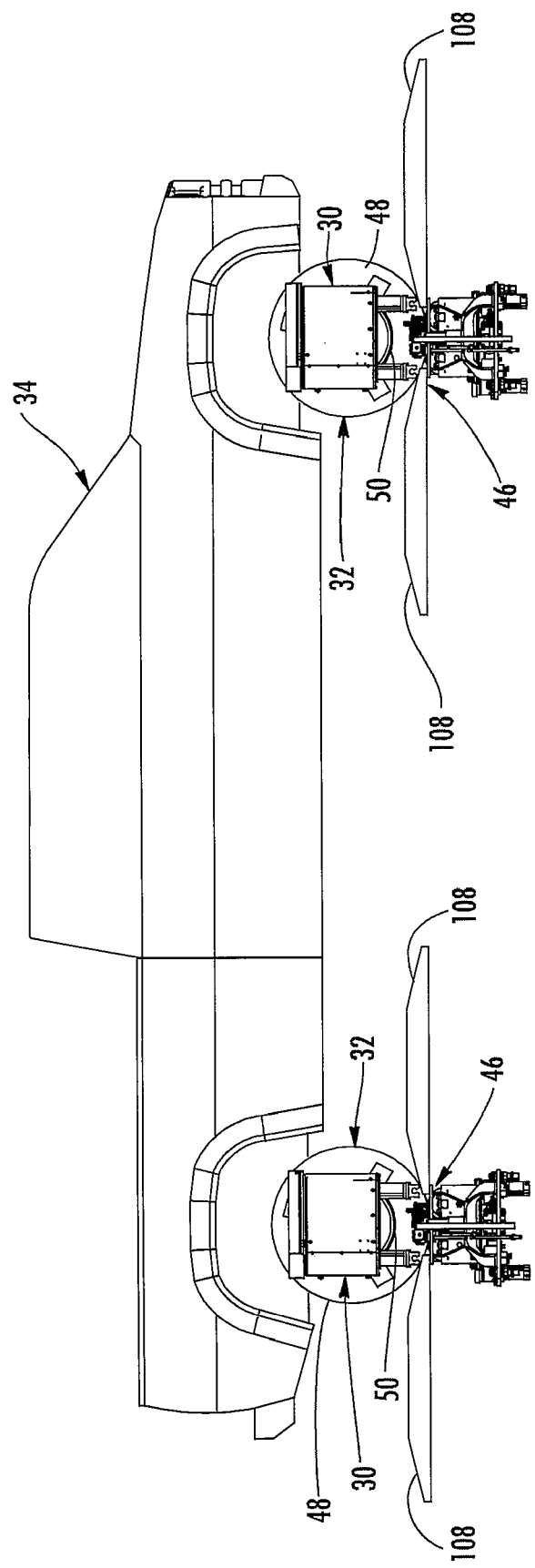
FIG. 3 is a side elevation view of the truck and wheel alignment measurement apparatuses of FIG. 1.

As illustrated in FIGS. 4-7, wheel alignment measurement apparatus 30 includes a contact assembly 36 mounted to a positioning assembly 38, a light source 40 mounted to the contact assembly 36 for producing a light beam 42, and a light beam receiving assembly 44. A vehicle wheel support structure 46 is used to receive a wheel 32 of vehicle 34, with the wheel 32 including a tire 48 mounted to a wheel rim 50 and the support structure 46 including powered drums 52 for rotating the wheel 32. Apparatus 30 is located adjacent the vehicle wheel support structure 46 such that the positioning assembly 38 is able to extend the contact assembly 36 into engagement or contact with a wheel 32 or tire 48 when positioned on the drums 52 (FIGS. 1-3).

Notably, the contact assembly 36 is not fixedly secured to the vehicle wheel 32, but rather merely touches or contacts the wheel 32 when engaged. The contact assembly 36, as described in more detail below, does not rotate or spin relative to the wheel 32, but is adapted to float or pivot relative to the wheel 32. Therefore, when engaged with the wheel 32, the contact assembly 36 is able to define a plane corresponding to a plane formed or defined by the wheel 32.

Light source 40 mounted to contact assembly 36 projects light beam 42 into light receiving assembly 44. Because contact assembly 36 defines a plane corresponding to wheel orientation or position when positioned against wheel 32, as noted above, light source 40 thus projects a light beam 42 that corresponds to the planar wheel orientation. As described in more detail below, light receiving apparatus 44 is able to detect the light beam 42 indicative of the wheel orientation and provide an output regarding the relative position of wheel 32. An operator, or alternatively an automated system, not shown, may then adjust various mechanical linkages on vehicle 34, such as a tie rod (not shown), for example, while monitoring the output to properly set the toe and/or camber of wheel 32. When an alignment measurement apparatus 30 is placed adjacent each of the wheels 32 on either side of an axle, for example the left and right front wheel assemblies, apparatuses 30 are able to provide planar wheel orientation of the wheel assemblies relative to one another. With the vehicle 34 properly centered between the apparatuses, such as via a vehicle adjustment table having conventional centering mechanisms, the alignment of the wheels on either side of the axle may be monitored using apparatuses 30 and adjusted by way of adjustment linkages and techniques (not shown). Thus, with the vehicle properly centered, alignment of both wheels of an axle provides for proper alignment of the wheels relative to the vehicle.

Contact assembly 36, as illustrated in FIGS. 4-7, includes several contact members or rollers 54 mounted on supports or support arms 56, with the support arms 56 affixed to and extending from a hub or head 58. In the illustrated embodiment, contact assembly 36 includes five support arms 56 positioned about hub 58. While only three points of contact are required to define a plane, multiple support arms 56 are provided to accommodate variously structured vehicles and wheel configurations. For example, the fender opening on certain vehicle models is positioned or formed about the wheel such that limited access is available for positioning rollers 54 against the wheels. Selective ones of the multiple support arms 56 may thus be used to enable rollers 54 to contact wheel regardless of the vehicle wheel fender design.

In the illustrated embodiment, support arms 56 are selectively adjustable in length due to their telescoping rod 60 and sleeve 62 construction. Rods 60 extend from hub 58 and are adapted to receive sleeves 62. Rods 60 and sleeves 62 each include a series of adjustment holes 64 with the adjustment holes 64 of sleeves 62 being adapted for alignment with the adjustment holes 64 of rods 60. A pin (not shown) may be inserted into adjustment holes 64 (FIG. 6) when so aligned to maintain or set the length of a support arm 56. The adjustable length of support arms 56 enables support arms 56 to accommodate variously sized wheels and/or variously sized rims. For example, certain vehicles utilize tires having a lower profile tire sidewall. Rods 60 and sleeves 62 may be used to adjust the length of support arms 56 to ensure that rollers 54 properly engage the sidewalls.

Rollers 54 are adapted to rotate with respect to support arms 56 and are intended to contact the tire 48 sidewall. Thus, when a wheel is rotated by drums 52 of wheel support assembly 46, rollers 54 correspondingly rotate when engaged with the tire 48 sidewall. Rollers 54 may be constructed of a plastic or rubberized or elastomeric material, and may be generally solid or hollow. Rollers may even be constructed as pneumatic type rollers.

Figure 5:
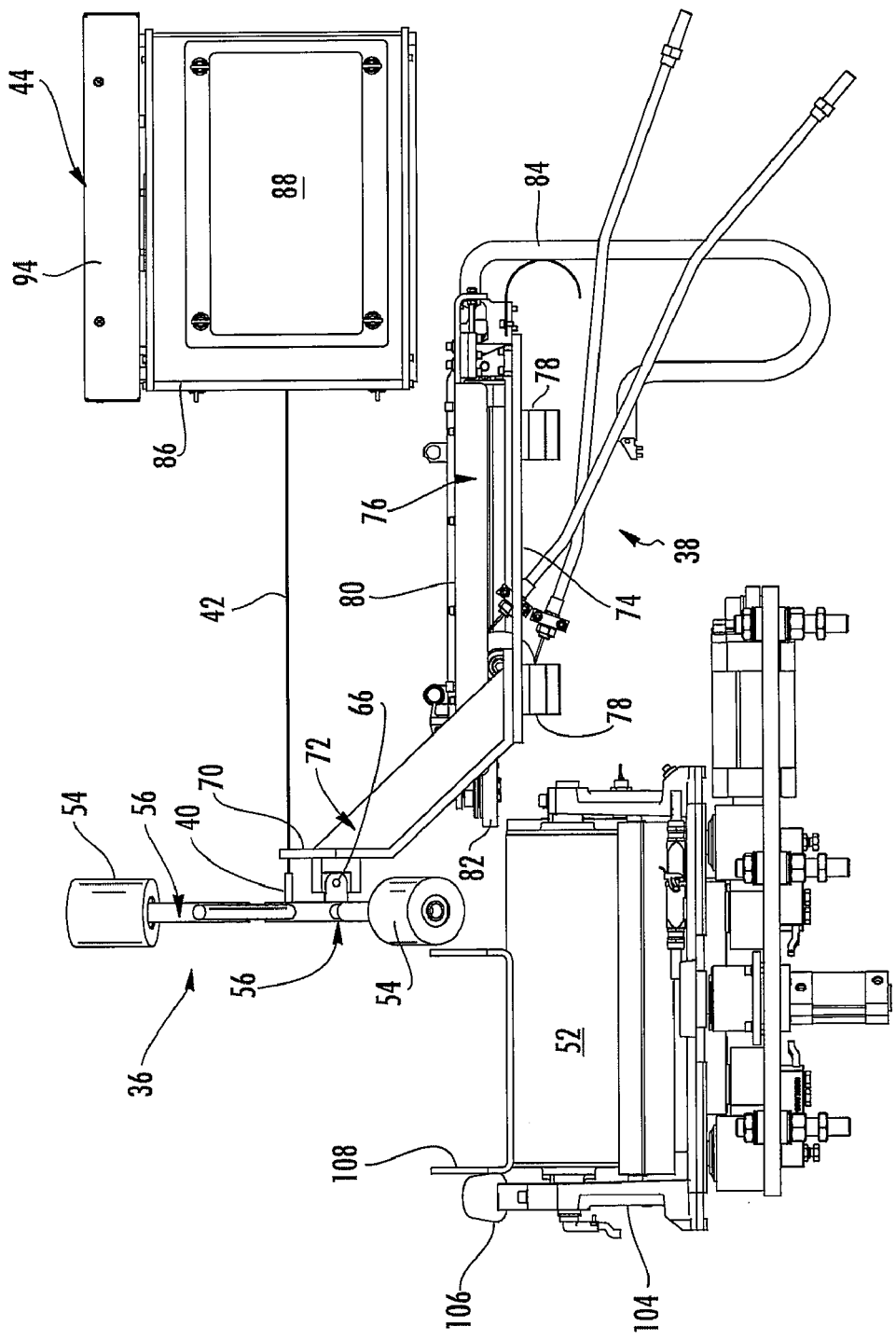
FIG. 5 is a side elevation of the apparatus of FIG. 4.
Figure 6:
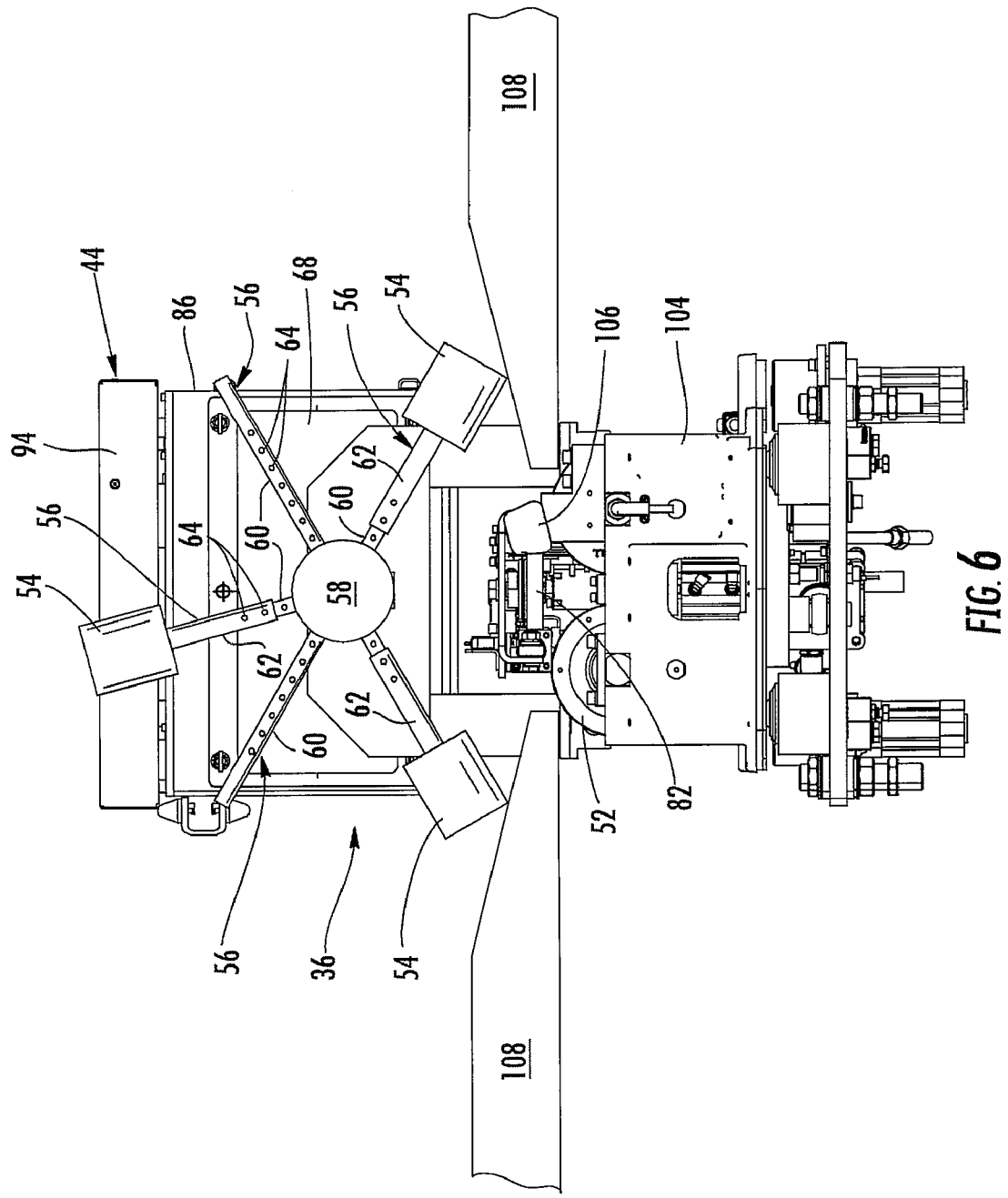
FIG. 6 is a front elevation of the apparatus of FIG. 4.
Figure 7:
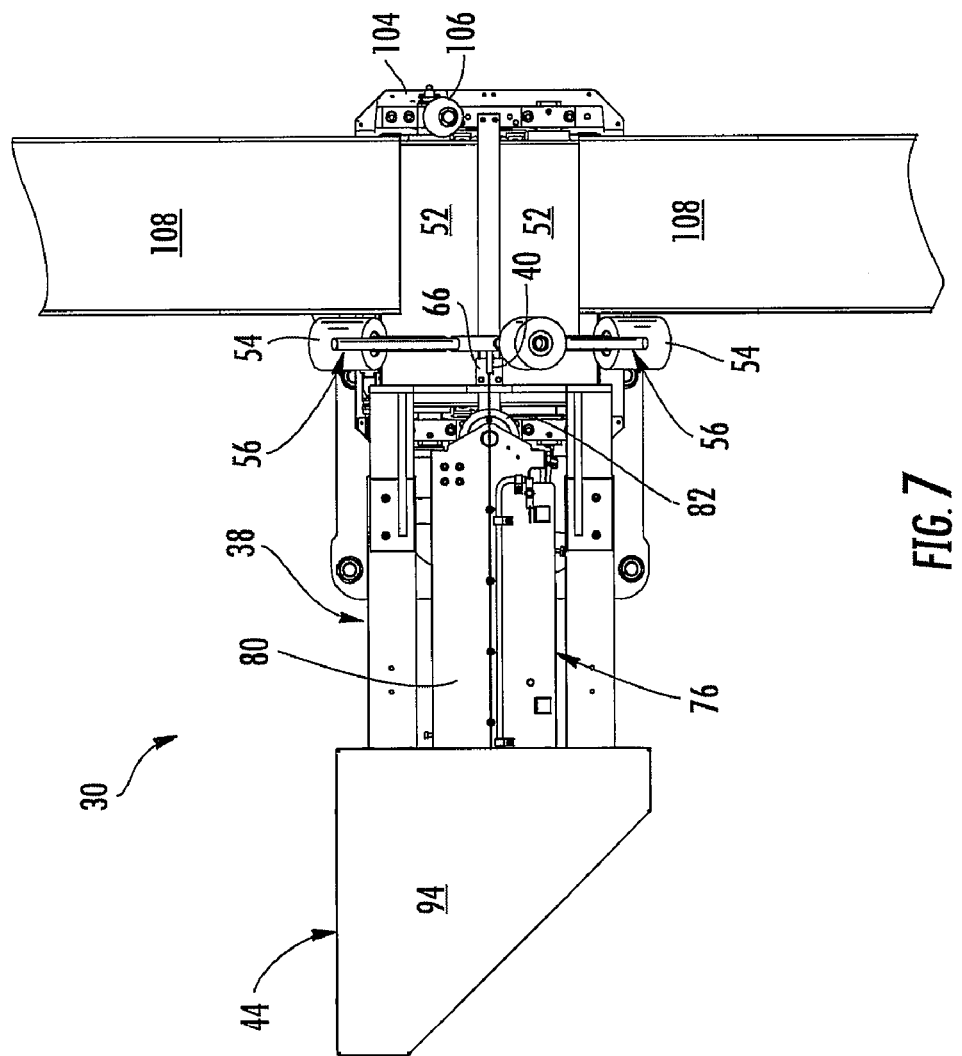
FIG. 7 is a top plan view of the apparatus of FIG. 4.

Support arms 56 and hub 58 do not rotate relative to wheel 32 when rollers 54 are caused to engage a wheel 32. However, hub 58 is pivotally connected to mount 70 of positioning assembly 38 such that hub 58 and support arms 56 are able to float with respect to a wheel 32. As shown in FIG. 5, hub 58 is pivotally connected to mount 70 of positioning assembly 38 by a pivot 66, which in the illustrated embodiment is a universal or gimbal type mount. Pivot 66 enables contact assembly 36 to floatingly adjust or position to the relative plane of the contacted wheel 32.

Contact assembly may be spring mounted via hub 58 and positioning assembly 38 such that rollers are urged and maintain contact with a tire sidewall when the positioning assembly, described below, causes contact assembly 36 to engage the tire sidewall and a portion of the positioning assembly contacts the tire for properly centering the vehicle relative to the wheel alignment apparatuses.

Referring again to FIG. 5, light source 40 is shown affixed to hub 58. Light source 40 is adapted to project a light beam 42 directed at light beam receiving assembly 44. In the illustrated embodiment, light source 40 is a laser, such as a laser diode or laser generator, but may alternatively be constructed as another type of device to produce a structured or collimated beam of light. Light source 40 is mounted to hub 58 such that light source 40 projects a light beam 42 that is substantially normal or perpendicularly oriented with respect to a plane defined by rollers 54 of contact assembly 36. The perpendicular alignment of light beam 42 to the plane defined by rollers 54, thus, enables light source 40 to produce a signal in the form of light beam 42 that is indicative of the orientation or position of a wheel 32 to which contact assembly 36 is engaged.

In the illustrated embodiment, light source 40 projects a light beam 42 that is generally perpendicularly oriented to lens 68 of light receiving assembly 44 when rollers 54 are oriented to define a plane that is generally parallel to lens 68. As described in more detail below, this predetermined orientation of light beam 42 to a plane defined by rollers 54 enables wheel alignment measurement apparatus 30 to be used in obtaining the proper adjustment of wheel 32.

Although the illustrated embodiment discloses that light source 40 is mounted and oriented with respect to hub 58 such that light beam 42 is substantially perpendicular to a plane defined by rollers 54, it should be appreciated that alternatively arranged, mounted, and/or oriented light sources may be employed within the scope of the present invention and still function as intended. For example, a light source may be mounted to a hub in a non-perpendicular orientation with a light receiving assembly correspondingly oriented to receive a light beam produced by the light source to produce a signal indicative of the position of a wheel engaged by the contact assembly.

It should also be appreciated that an alternative wheel alignment measurement apparatus may be constructed in accordance with the present invention having a light source that is alternatively located and/or mounted and still function as intended. For example, a reflective surface, such as a mirror or the like (not shown), may be mounted to hub with a light source mounted to project a light beam directed at the reflective surface, which in turn directs the light beam toward the light receiving assembly. In one embodiment, the light source could be mounted internally of the light receiving assembly and project the light at the reflective surface. Alternatively, a light source could be mounted above, below, to the sides, or offset from the light receiving assembly and directed at the reflective surface. It should be appreciated that the reflective surface may include multiple surfaces for receiving and reflecting the light beam to direct the light beam in a desired orientation, such as perpendicular, towards the light receiving assembly. It should also be appreciated that multiple separate reflective surfaces may be employed for receiving and reflecting a light beam, with such reflective surfaces being mounted or positioned to the hub and/or at alternative positions and/or to alternative structures on the wheel alignment measurement apparatus, such as to the positioning assembly.

As illustrated above, contact assembly 36 is adapted to engage a wheel 32 by being pressed against the wheel 32. In another alternative, a contact assembly may be fixedly secured to a wheel rim with the light beam projecting from or reflected off of the contact assembly.

Positioning assembly 38, referring again to FIGS. 4-7 and as noted above, includes a mount 70 to which contact assembly 36 is affixed via pivot 66. Positioning assembly 38 further includes a locating assembly 72 to which mount 70 is affixed. Locating assembly 72 is adapted to move in a generally lateral direction relative to wheel support structure 46, approximately parallel to the axes of powered drums 52, to selectively engage and disengage contact assembly 36 with wheel 32 of vehicle 34.

Locating assembly 72 includes a pair of frame rails 74 to which mount 70 is affixed (see FIGS. 8-9) and a drive mechanism 76 for enabling locating assembly 72 to move relative to wheel support structure 46. Each frame rail 74 includes a pair of bearing blocks 78 to aid movement of locating assembly 72 (see FIGS. 8-9). Bearing blocks 78 are adapted to travel or slide on guide rods or rails (not shown) such that locating assembly 72 is readily able to engage contact assembly 36 with a vehicle wheel 32.

Drive mechanism 76 is adapted to selectively move locating assembly 72 and, thus, in turn, move positioning assembly 38 away and toward wheel support structure 46 in the generally perpendicular direction noted above. Drive mechanism 76 may be constructed as a hydraulic or pneumatic fluid drive cylinder, an electric drive, such as a screw drive, a pulley drive, or other such drive apparatus. In the illustrated embodiment, drive mechanism 76 includes a housing 80 that remains fixed or stationary relative to locating assembly 72 when drive mechanism 76 is used to move locating assembly 72. As described below, a distance sensor (not shown) may be mounted to housing 80 for providing relative position information of contact assembly 36.

Figure 4:
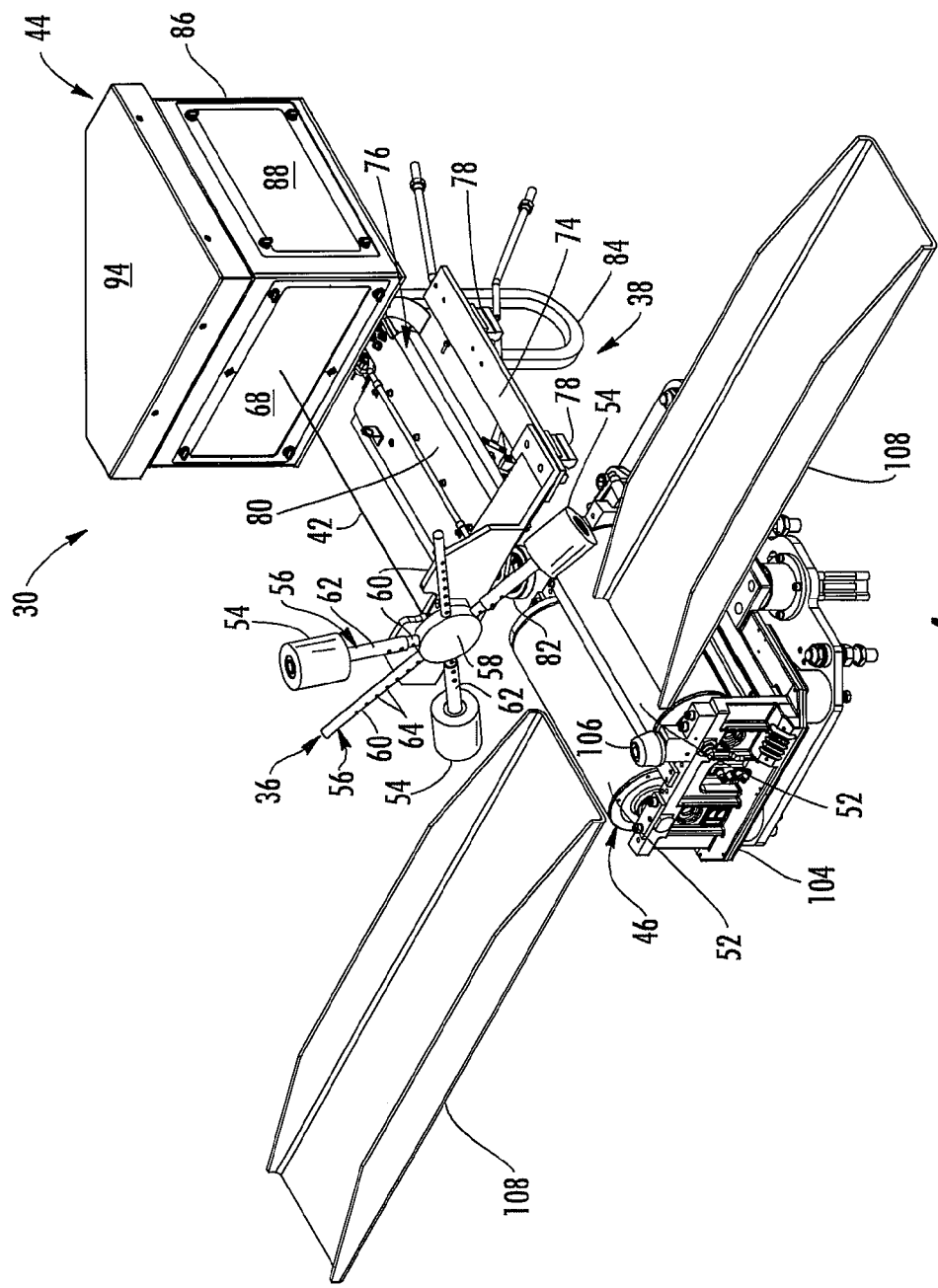
FIG. 4 is a perspective view of one of the wheel alignment measurement apparatuses of FIG. 1.

Referring to FIGS. 4 and 5, positioning assembly 38 further includes a centering roller 82. Centering roller 82 is adapted to contact the tire 48 sidewall when positioning assembly 38 is engaged with a tire 48 and functions to center and/or maintain the vehicle 34 on drums 52 of wheel support structure 46. As described in more detail below, wheels 32 are preferably aligned relative to centerline of vehicle 34 such that the orientation of vehicle 34 relative to opposed support structures 46 and, thus, opposed wheel alignment measurement apparatuses 30 is desirably required to be maintained. Opposed support structures 46 and opposed wheel alignment measurement apparatuses 30 refer to the pair of wheel support structures 46 and wheel alignment measurement apparatuses 30 located adjacent the left and right front wheels 32 or left and right rear wheels (FIGS. 1-3) 32.

Referring to FIGS. 1-3, opposed wheel support structures 46 and wheel alignment measurement apparatuses 30 are positioned in a predetermined orientation, with each wheel alignment measurement apparatus 30 and its associated wheel support structure 46 also being substantially equivalently positioned relative to each other. Thus, the vehicle 34 centerline may be oriented substantially equidistant between opposed wheel alignment measurement apparatuses 30 by positioning the left and right wheels 32 of each pair of front and/or back wheels 32 in substantially similar or like orientation on opposed wheel support structures 46 via centering rollers 82.

Centering roller 82 may be affixed to drive mechanism, mount, and/or locating assembly, such as to the frame rails of locating assembly. Although not shown, centering roller 82 may be affixed to positioning assembly 38 via a spring mount such that centering roller 82 is able to deflect relative to contact assembly 36 when positioning assembly 38 is engaged with wheel 32, such that rollers 54 of positioning assembly 38 and centering roller 82 may both engage tire 48. The spring mount also provides a centering force to tire 48 to maintain the proper orientation of vehicle 34 on opposed wheel support structures 46.

Centering rollers 82 from a pair of alignment measurement apparatuses 30 positioned for use in measuring the left and right wheels on either side of an axle may be secured to a conventional cable centering system (not shown) such that the centering rollers 82 of each apparatus move in unison to properly center the vehicle relative to the apparatuses 30. Such systems may be employed with vehicle adjustment tables (such as illustrated in FIGS. 12-15). A table incorporating such a centering system is constructed with apparatuses 30 spaced equidistant about the centerline of the table. The centering rollers 82 affixed to the cable centering system then align the centerline of the vehicle with the centerline of the table. Alternatively, positioning assembly 38 may include a distance sensor (not shown) for determining the relative location of positioning assembly 38 and, in turn, enabling centering roller 82 to orient and maintain the vehicle centerline in proper position relative to opposed wheel alignment measurement apparatuses 30. Distance sensor may be mounted to housing 80 of drive mechanism 76 and be used to detect a distance between distance sensor and mount 70 as mount 70 is moved toward and away from wheel support structure 46. For example, distance sensor may be constructed as a conventional laser distance sensor adapted to project a beam at mount 70 and receive a return signal indicative of the relative position of mount 70 and, thus, contact assembly 36. Alternatively, a distance sensor may be affixed to mount 70 and used to determine a distance to a fixed object located on, for example, the positioning assembly 38 or light receiving assembly 44. A distance sensor may also be alternatively located on the light receiving assembly 44 and project, for example, toward the contact assembly 36 or toward the mount 70. Still further, a distance sensor may be incorporated into or included on the drive mechanism 76, such as a digital encoder or other type of detection device for determining the relative position of the drive mechanism.

Distance measurements from distance sensors of opposed wheel alignment measurement apparatuses 30 may then be compared for controlling the drive mechanisms 76 and, thus, properly positioning a vehicle 34 on opposed wheel support structures 46 to locate the vehicle centerline equidistant between opposed wheel alignment measurement apparatuses 30. For example, drive mechanisms 76 may be adjusted until the distance measurements detected by distance sensors are equal. By adjusting drive mechanisms 76 in this manner, vehicles 34 of varying width may be accommodated with the centerlines of the various models of vehicles being maintained equidistant between opposed wheel alignment measurement apparatuses 30.

A flexible power cable 84 is also provided to locating assembly 72 for supplying power to drive mechanism 76 and/or the distance sensor (FIGS. 4 and 5).

Figure 9:
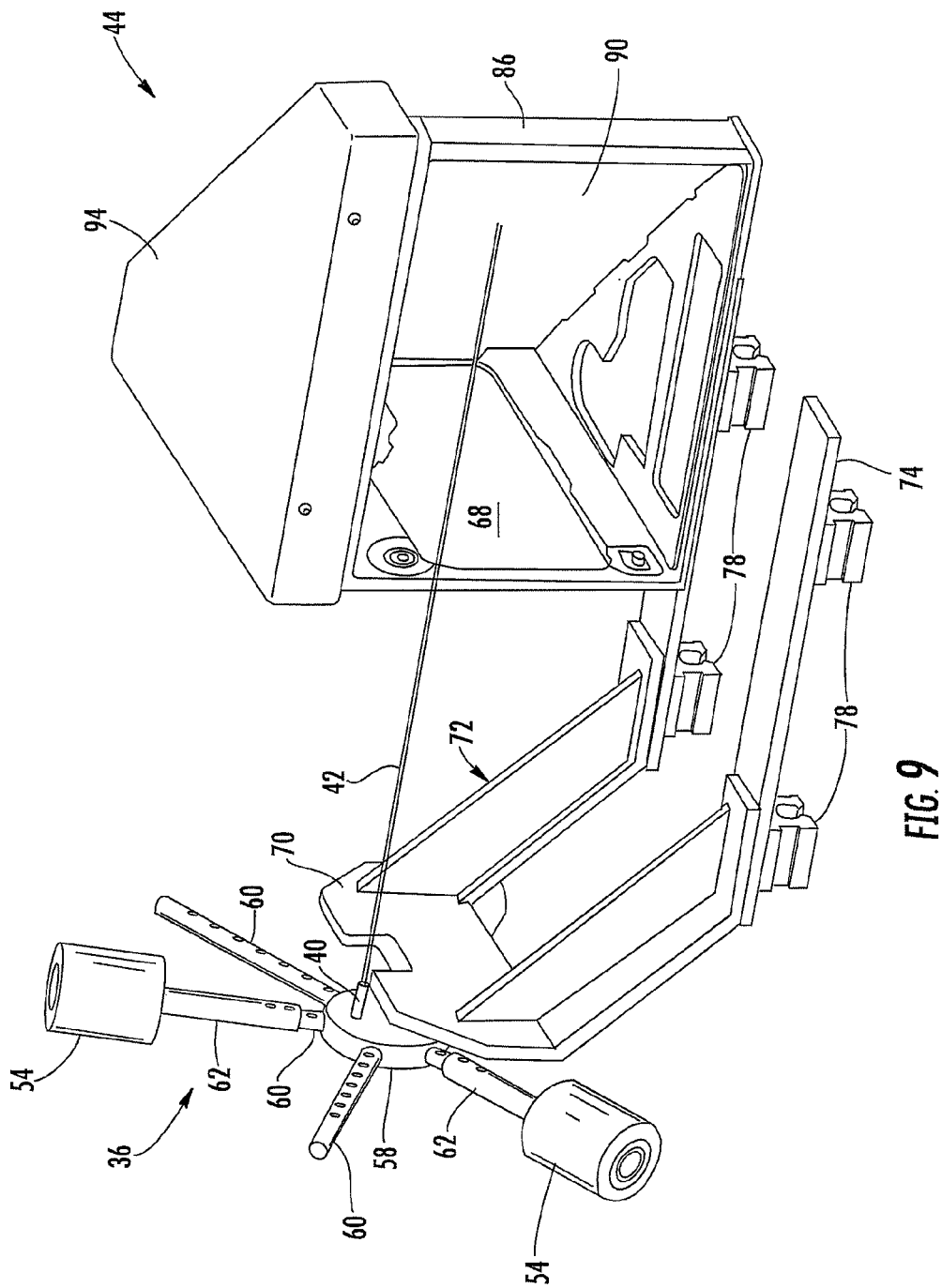
FIG. 9 is an alternative partial perspective view of the wheel alignment measurement apparatus of FIG. 8.
Figure 10:
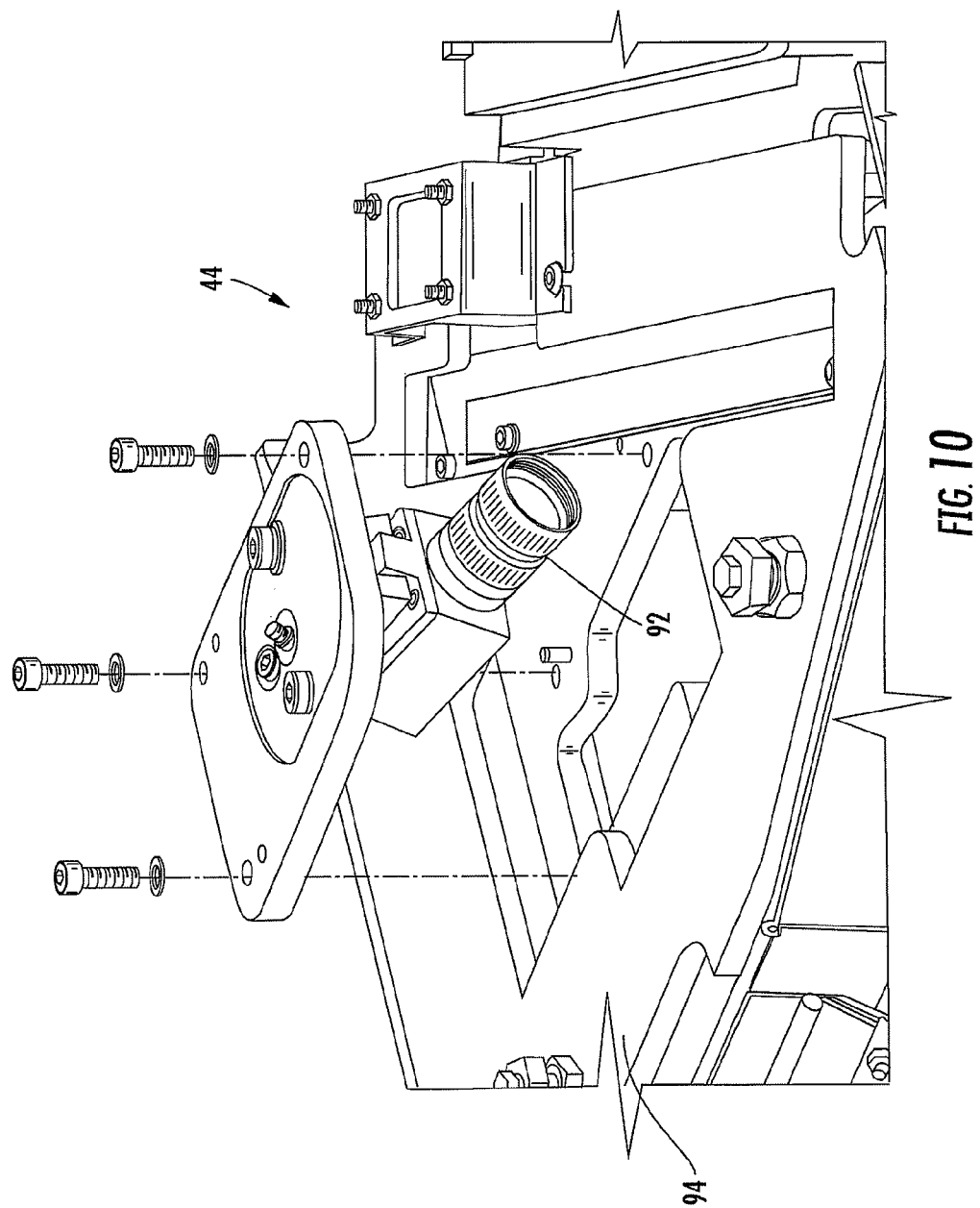
FIG. 10 is a partial perspective exploded view of the camera of the light receiving assembly.

In the illustrated embodiment, light beam receiving assembly 44 is substantially similar to a light beam receiving unit used with a Burke E. Porter Machinery Co. headlamp aimer, such as a Model 100, 200, 300, or 7110 HLA Headlamp Aimer. As illustrated in FIGS. 4-10, light beam receiving assembly 44 includes a housing 86 having a lens 68, a target or projection plate 88, a reflective panel or mirror 90 (FIGS. 8 and 9), and an image sensor or light detector in the form of camera 92 mounted to an upper lid 94 member of housing 86 (FIG. 10). As described in more detail below, the light beam 42 projected by light source 40 is projected into housing 86 through lens 68 to produce an image 96 (FIG. 11) on the target 88 that is detected by the camera 92. A signal from the camera 92 may then be transmitted to a monitoring device, such as a display monitor (not shown), adapted to display a representation of the projected image 96. An operator may then adjust the position of wheel 32 until the wheel 32 is properly aligned as determined by the projected image 96 detected by camera 92. It should be appreciated that an alternative light detector other than camera 92 adapted to detect the impinged light beam 42 on target 88 may be employed within the scope of the present invention.

Lens 68 functions to direct the projected light beam 42 at mirror 90, which in turn reflects the projected light beam 42 onto target 88. In the illustrated embodiment, lens 68 is a Fresnel lens having a focal length of approximately 18 inches. The use of a Fresnel lens with an extended focal length enables the image 96 projected onto target 88 to have greater resolution than would be possible with a non-Fresnel lens positioned an equivalent distance from the light source 40, and, therefore, enables greater accuracy toe and/or camber measurements. Lens 68 is mounted to housing 86 with a frame and lens 68 oriented with its flat surface facing inwardly and the concentric rings of the Fresnel lens 68 directed outwardly.

The Fresnel lens also functions to converge light toward target 88. For example, light receiving assembly may be constructed such that a perpendicularly projected light beam will create a dot at the central portion of target 88 regardless of where the projected light beam contacts or enters lens 68. Correspondingly, projected light beams that enter lens 68 at an angle will be displayed as offsets from the central portion of target 88. Thus, the center point of the vehicle wheel need not be "aimed" or positioned to exactly correspond with the relative center of target 88.

Figure 8:
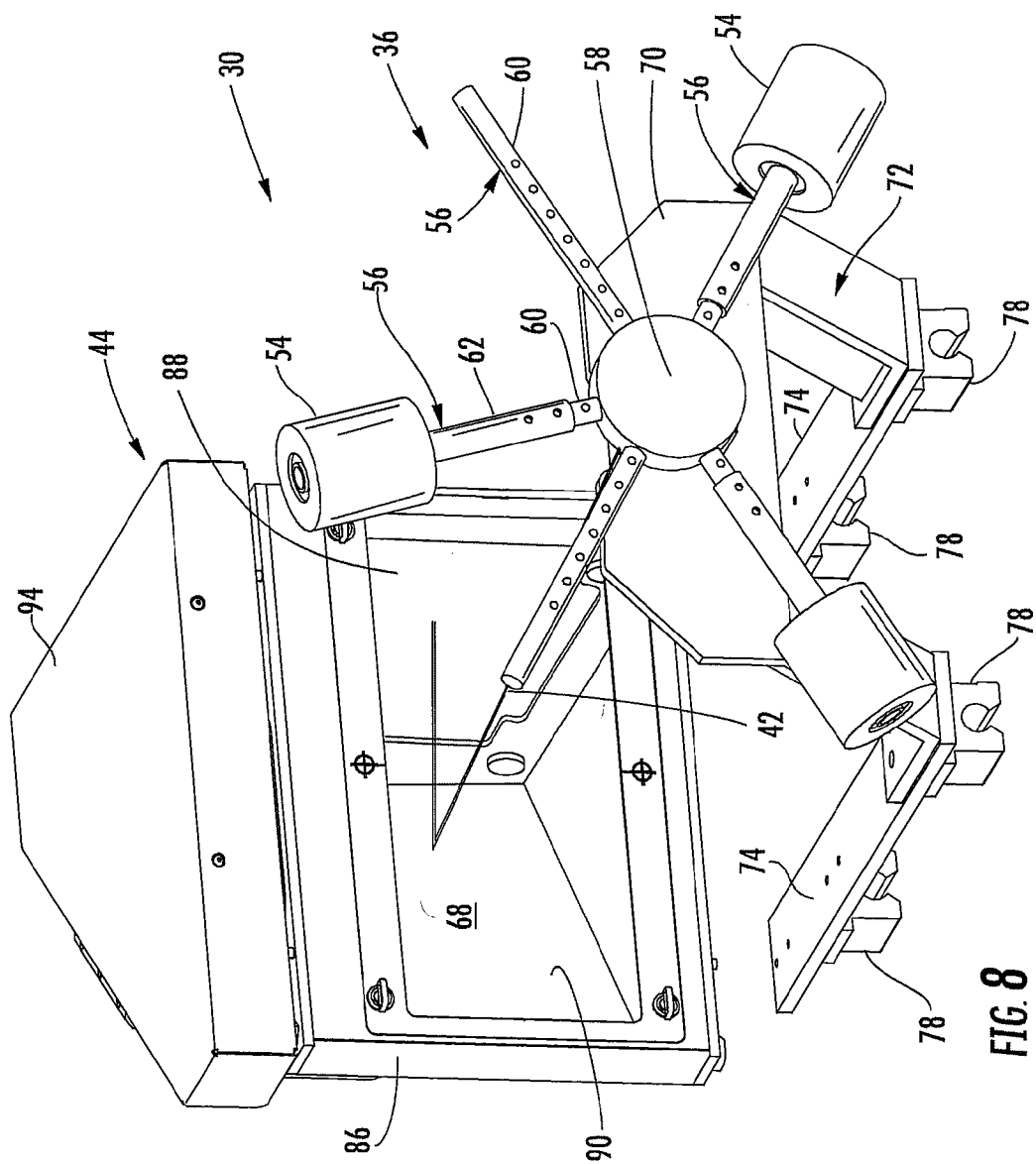
FIG. 8 is a partial perspective view of a wheel alignment measurement apparatus disclosing the interaction of a light beam projected from the contact assembly into the light receiving assembly.
Figure 11:
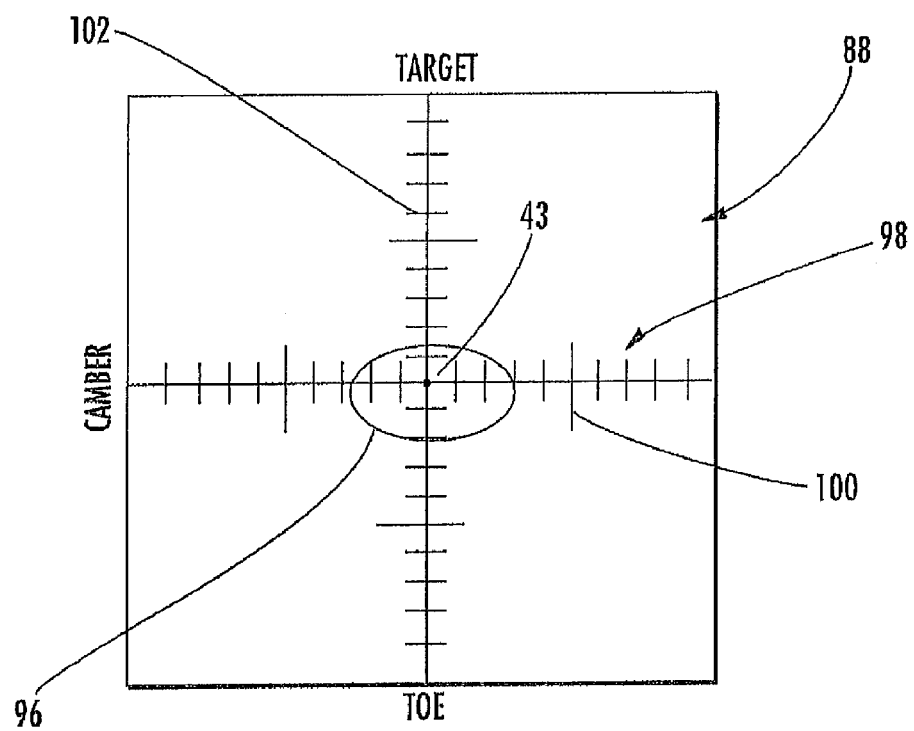
FIG. 11 is a schematic illustration of indicia located on a target of a light receiving assembly for measuring toe and/or camber.

As illustrated in FIG. 8, the light beam 42 is projected onto mirror 90 and reflected towards target 88. As described below, camera 92 may be calibrated based on a known orientation or placement or impingement location of light beam 42 on target 88 such that camera 92 via the detection of light beam 42 on target 88 by camera 92 is able to provide toe and/or camber information. Alternatively, as schematically illustrated in FIG. 11, target 88 may include indicia 98 representing scales 100, 102 for the toe and camber of the wheel 32, with toe being measured about the horizontal axis and camber measured along the vertical axis. It should be appreciated that if wheel 32 defined a perfect plane the resulting image 96 produced on the target 88 would appear as a dot 43. It should be appreciated, however, that due to inherent variation or tolerances in the manufacturing and assembly process of a vehicle axle and wheel 32, wheel 32 will not rotate in a perfect plane, but rather will include run out that will be reflected in a generally sinusoidal motion of a point on the wheel. Additionally, due to tire imperfections and other elements of a tire, such as raised lettering, or the like, the rotation of a wheel 32 will create a wobbling effect detected by rollers 54 of contact assembly 36. In turn, the resultant image 96 produced by light source 40 projecting through lens 68 onto indicia 98 will appear as approximately circular or generally oval, as shown. Thus, the center point of the image 96 represents the plane defined by the rotating wheel 32.

Indicia 98 may be provided with toe scales 100 and camber scales 102 representing degrees of toe or camber, respectively. Thus, an operator may adjust the wheel linkages, such as a tie rod, until the displayed toe and camber values on toe scales 100 and camber scales 102 are at a predetermined desired result. The point of intersection of the toe scales 100 and camber scales 102 may alternatively represent a predetermined desired value of toe and camber. For example, assembled automobiles are designed to have a particular degree of toe and/or camber for proper steering and performance of the vehicle. The intersection of toe scales 100 and camber scales 102 may be designed such that when image 96 is centered about the intersection, the proper toe and camber values are obtained.

FIG. 10 illustrates camera 92 removed from housing 86 of light beam receiving assembly 44. Camera 92 is directed at mirror 90 and simultaneously detects and captures the projected image 96 and may also detect and capture the reflected image from the indicia 98 of target 88. In the illustrated embodiment, camera 92 is a conventional charge coupled device or CCD type camera. Camera 92 is thus able to detect image 96 and display a signal in response thereto based on a known pixel position such that indicia 98 on target 88 are not needed or present. The signal sent by camera 92 to a display monitor may then be pre-adjusted or calibrated to reflect toe and/or camber values of a wheel 32. It should be appreciated that the signal from camera 92 may alternatively be sent to light bars reflecting toe and/or camber values. For example, the display of a light bar may be monitored while adjusting toe and/or camber with the predetermined proper toe and/or camber value being obtained when the display of the light bar is positioned at a particular point on the light bar or changes to a particular color, such as green.

As previously noted, camera 92 may be calibrated such that camera 92 is able to provide toe and/or camber information of wheel assembly 32 based on the impingement location of light beam 42 on target 88 as viewed by camera 92. For example, when camera 92 is constructed as a CCD camera, or other such device capable of providing or equating positional information from a detected light source, camera 92 may be used to directly provide signals indicative of the toe and/or camber based on the detected location of light beam 42 on target 88. In the embodiment of a light detector constructed as CCD camera 92, camera 92 detects or views the impinged light beam 42 on target 88 in a known grid of pixels of camera 92. By placing contact assembly 36 in known positions whereby light source 40 projects light beam 42 from the known position into light receiving assembly 44, camera 92 may be calibrated to correlate the detected or viewed impinged light beam 42 on target 88 to the known position of contact assembly 36. Thus, the output of camera 92 may be used to directly provide toe and/or camber information of a wheel assembly 32 against which contact assembly 36 is positioned.

In one embodiment, camera 92 may be recalibrated upon retraction of contact assembly 36 from a wheel assembly 32 by positioning assembly 38. For example, when positioning assembly 38 retracts, contact assembly 36 may be caused to contact a calibration device or plate that causes contact assembly 36 to be positioned in a known orientation, such as normal to light receiving assembly 44.

Although camera 92 is illustrated as being directed toward mirror 90, it should be appreciated that camera 92 may be alternatively oriented to be directed at and detect image 96 from target 88. A camera 92 may be alternatively mounted within or external to housing 86 and still function as intended as well. For example, a camera 92 may be mounted from the bottom of housing or through a side, or the like.

Referring again to FIGS. 1, 1A, and 3-7, wheel support structure 46 includes the previously noted drums 52 for rotating wheels 32, where drums 52 are powered to rotate wheels 32 during wheel alignment measuring. As understood from FIG. 5, drums 52 are mounted on a floating base 104. Base 104 is adapted to rotate or swivel such that drums 52 are positioned based on interaction with wheel 32 without drums 52 influencing the position or orientation of wheel 32. Wheel support structure 46 also includes bumper 106 that prevents wheels 32 from being displaced off from wheel support structure 46 by contact assembly 36 and positioning assembly 38.

Wheel support structures 46 also include ramps 108 to direct guide wheels 32 onto and away from drums 52. Four wheel support structures 46 may be positioned within or above a pit to allow a vehicle to be driven thereon for four-wheel alignment purposes. Alternatively, one or more support structures may be incorporated onto a stand or support base such that a vehicle may be driven onto the support base and into engagement with the wheel support members.

Figure 11A:
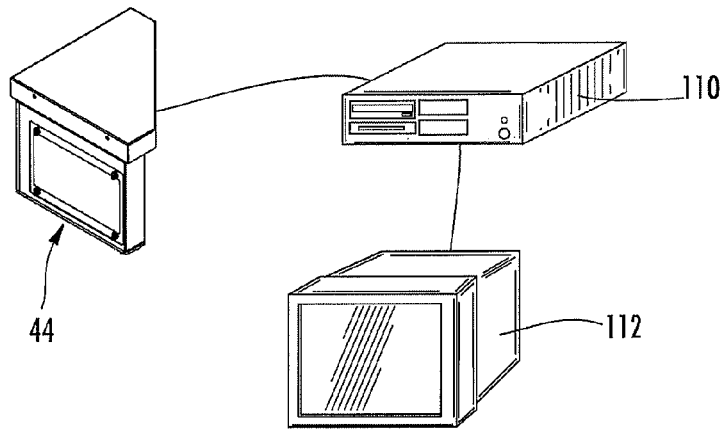
FIG. 11A is a schematic illustration of a control and display monitor for displaying wheel alignment information from a light beam receiving assembly.
Figure 11B:
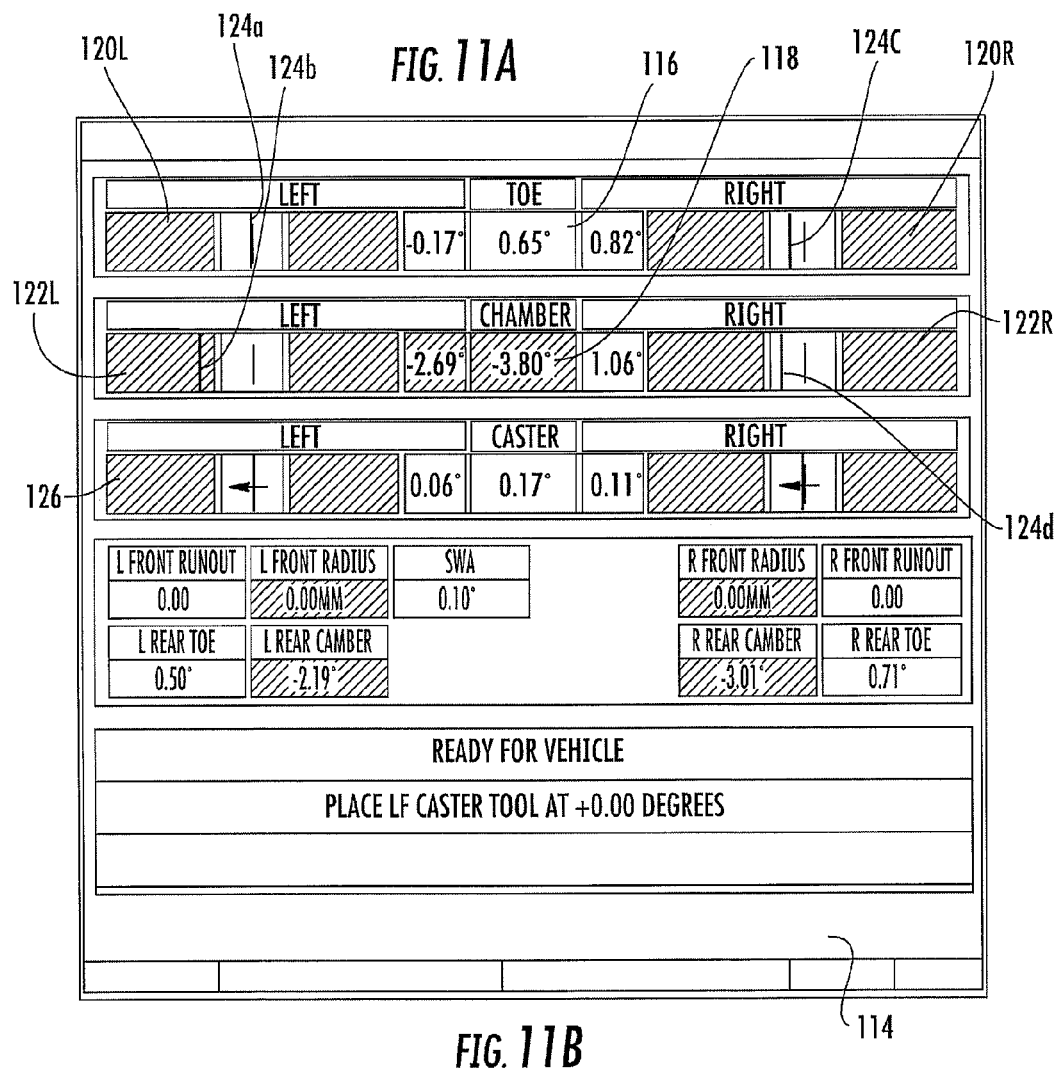
FIG. 11B is a screen display from the monitor of FIG. 11A illustrating displayed wheel alignment information.

As described above, an operator may adjust wheel 32 while viewing the projected image 96 as displayed by the camera 92 through a display monitor. Alternatively, however, as illustrated in FIGS. 11A and 11B, the signal from the camera 92 of light beam receiving assembly 44 may be transmitted to a processing device or control 110 programmed or constructed to perform calculations based on the received signal transmitted by camera 92. Control 110, in turn, may then operate to display images on a monitor 112, with such images comprising, for example, a display screen 114 providing information indicative of the wheel alignment characteristics. For example, control 110 may perform mass area calculations on the signal from camera 92. Display screen 114 may impart alignment information in the form of actual toe values 116 and camber values 118, as well as electronically generated toe light bars 120L, 120R and camber light bars 122L, 122R having display symbols 124*a, b, c, d* that move within the light bars 120, 122 based on the actual toe and/or camber. As shown, the light bar fields 120, 122 may include in-tolerance and out-of-tolerance limit representations. Control 110 may also be used to perform caster calculations based on a conventional caster sweep, wherein the toe and camber of the front wheels are determined while the front wheels are turned side-to-side while the wheels are either static or rotating about their axis of rotation. The determined toe and camber values of each wheel are then plotted relative to each other, with the resultant line representing the caster of the wheel. The caster may also be represented on display screen, such as in the display fields at 126.

Still further, it should also be appreciated that an alternative wheel alignment measuring apparatus may be constructed without a camera and/or a mirror and still function as intended within the scope of the present invention. For example, the target may be translucent such that an operator is able to directly view the image produced by light beam, in which case camera is not required. Similarly, light beam may be projected through lens directly onto target without the need for a mirror.

It should also be appreciated that vehicle wheel alignment may be measured using fewer than four wheel alignment measurement apparatuses 30 as illustrated in FIGS. 1-3. For example, only two apparatuses 30 positioned adjacent either both the front or both the rear wheels of a vehicle, such as a two-wheel drive vehicle, may be used to adjust the toe and camber of the front or rear wheels with respect to the vehicle centerline. Still further, a single apparatus 30 may be used to adjust a wheel of a vehicle without the use of a second or more apparatuses positioned adjacent the remaining vehicle wheels. In the case of a single wheel alignment measurement apparatus, for example, the wheel toe and/or camber may be measured and set without respect to the vehicle centerline, or the centerline may be taken into account electronically, or by a separate mechanical adjustment or calibration step.

Figure 12:
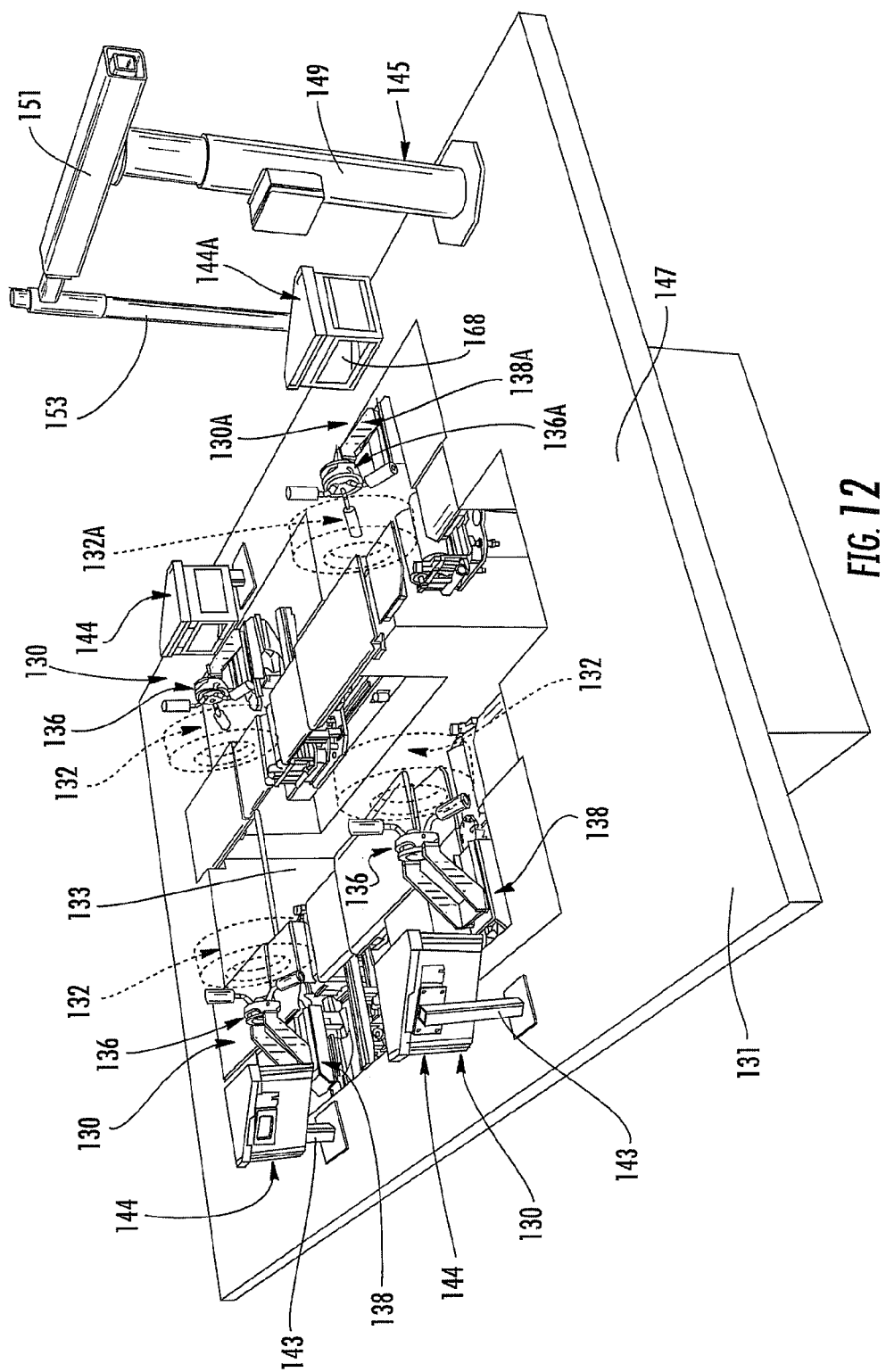
FIG. 12 is a perspective view of an alternative embodiment of a four wheel alignment measurement apparatus in accordance with the present invention integrated to a vehicle adjustment table and having a light receiving assembly movably mounted to a gantry for positioning the light receiving assembly in front of vehicle headlights.
Figure 13:
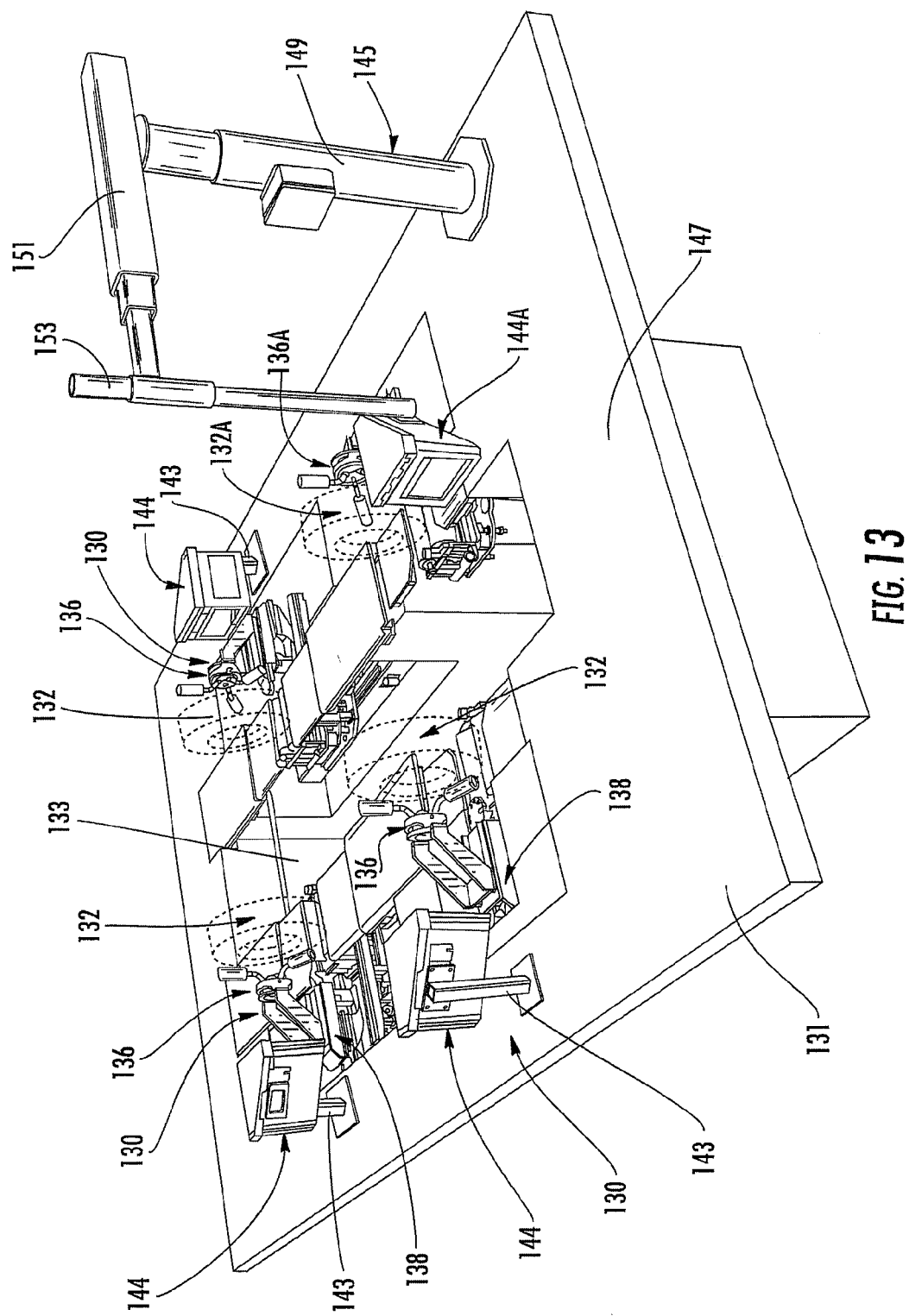
FIG. 13 is a perspective view of the alignment measurement apparatus of FIG. 12 with the gantry mounted light receiving assembly positioned to be in alignment with a first vehicle headlight.
Figure 14:
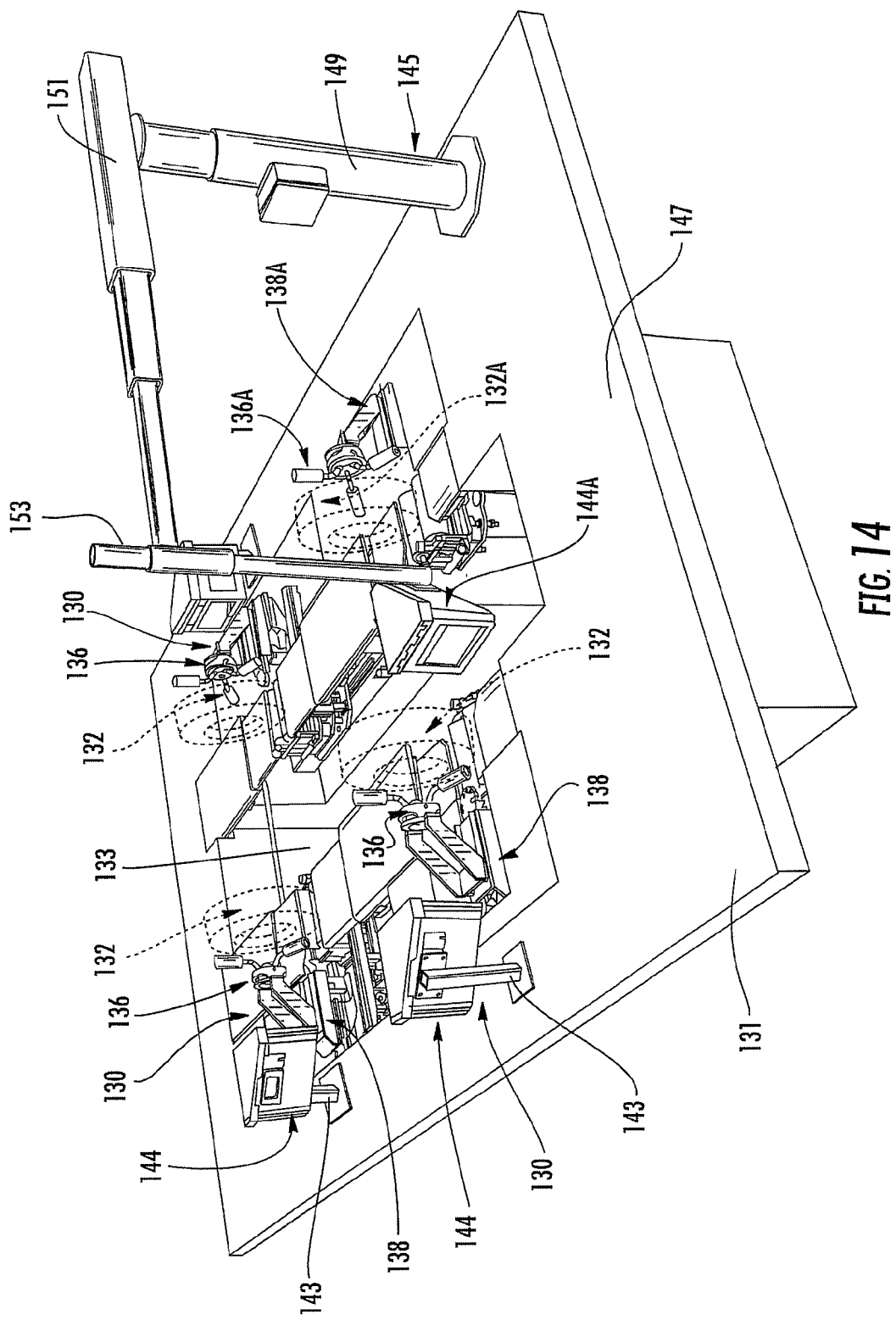
FIG. 14 is a perspective view of the alignment measurement apparatus of FIG. 12 with the gantry mounted light receiving assembly positioned to be in alignment with a second vehicle headlight.

An alternative four wheel alignment measurement apparatus is illustrated in FIGS. 12-14 incorporated into a vehicle adjustment table 131 having a pit 133. A wheel alignment measurement apparatus 130 is shown in operational relation to each of three wheel assemblies 132 of a vehicle (not shown). A fourth wheel alignment measurement apparatus 130A utilizing a light beam receiving assembly 144A mounted to a receiving assembly moving apparatus, which in the embodiment shown is a gantry 145, is shown in operational relation to the fourth wheel assembly 132A. In addition to being used for measuring toe and camber of wheel assembly 132A, light beam receiving assembly 144A of wheel alignment measurement apparatus 130A is adapted to be selectively positioned using gantry 145 in front of the headlamps of a vehicle for use as a measurement device, or headlamp aimer, while adjusting the headlamps.

Wheel alignment measurement apparatuses 130 are of generally like construction to wheel alignment measurement apparatuses 30 discussed above, with reference numeral 100 added to the reference numbers used in connection with alignment measurement apparatus 30 when illustrating the generally like components. Each wheel alignment measurement apparatus 130 includes a contact assembly 136, a positioning assembly 138, a light source (not shown) mounted to the contact assembly 136, and a light beam receiving assembly 144 mounted to a post 143. Wheel alignment measurement apparatus 130A is generally similar, and thus has similar components designated with the suffice A, with the noted exception of light beam receiving assembly 144A being secured to gantry 145. Due to the similarity of alignment measurement apparatuses 30 and 130, not all of the structural and operational details of alignment measurement apparatus 130 will be discussed herein. Notably, contact assembly 136 of wheel alignment measurement apparatus 130 is substantially similar to the contact assembly 236 employed in the embodiment of FIGS. 15-21, without the reflector box 255 of FIGS. 15-21 mounted thereto. Contact assembly 236 is described in more detail below.

As noted, wheel alignment measurement apparatus 130A incorporates a light beam receiving assembly 144A mounted to gantry 145. Gantry 145 is affixed to the forward end 147 of vehicle adjustment table 131 wherein the front end of a vehicle is facing when positioned thereon. Although not shown, an operator or automated equipment may be positioned within pit 133 for adjusting various mechanical linkages, such as a tie rod, of the vehicle positioned on the adjustment table 131 above pit 133. The illustrated gantry 145 includes a vertically telescoping and rotating base 149, a horizontally telescoping first arm 151, and a rotating second arm 153.

Gantry 145 generally operates to position light beam receiving assembly 144A in one of three positions. The first position is illustrated in FIG. 12 in which light receiving assembly 144A is positioned in operational relationship to contact assembly 136A such that a light beam (not shown) projected by the light source (not shown) of contact assembly 136A may be projected into light beam receiving assembly 144A in the manner described above. Wheel alignment measurement apparatus 130A may then operate to determine the toe and camber of wheel assembly as previously detailed.

The second and third positions into which gantry 145 may position light beam receiving assembly 144A are illustrated in FIGS. 13 and 14. These positions place the light beam receiving assembly 144A in front of the left and right headlamps of a vehicle located on the vehicle adjustment table 131, such as in front of the headlamps 107 of vehicle 34 of FIG. 1. As previously noted, in the illustrated embodiment light beam receiving assembly 144A is substantially similar to a Burke E. Porter Machinery Co. headlight aimer. Thus, light beam receiving assembly 144A may be used not only to measure wheel alignment characteristics during the wheel alignment procedures, but also to measure headlamp alignment or orientation characteristics as part of the headlamp alignment process when light beam receiving assembly is positioned as shown in FIGS. 13 and 14. For example, with light beam receiving assembly 144A positioned as shown in either FIGS. 13 and 14 and with vehicle 34 positioned on adjustment table 131, headlamp light beams 109 (FIG. 1) would project into and be received by receiving assembly 144A such that headlamps 107 could be conventionally aimed or aligned.

In the illustrated embodiment, gantry 145 is automated to rotate, extend and retract base 149, extend and retract first arm 151, and rotate second arm 153 to properly place the lens 168 of light beam receiving assembly 144A into position to receive projected light from either the light source of contact assembly 136A or from a headlamp of a vehicle. It should be appreciated, however, that an alternative receiving assembly moving apparatus may be manually movable to position the light beam receiving assembly 144A. Further, various stationary fixtures located proximate the wheel and headlamps may be alternatively employed into which the movable light receiving assembly may be selectively placed.

Figure 15:
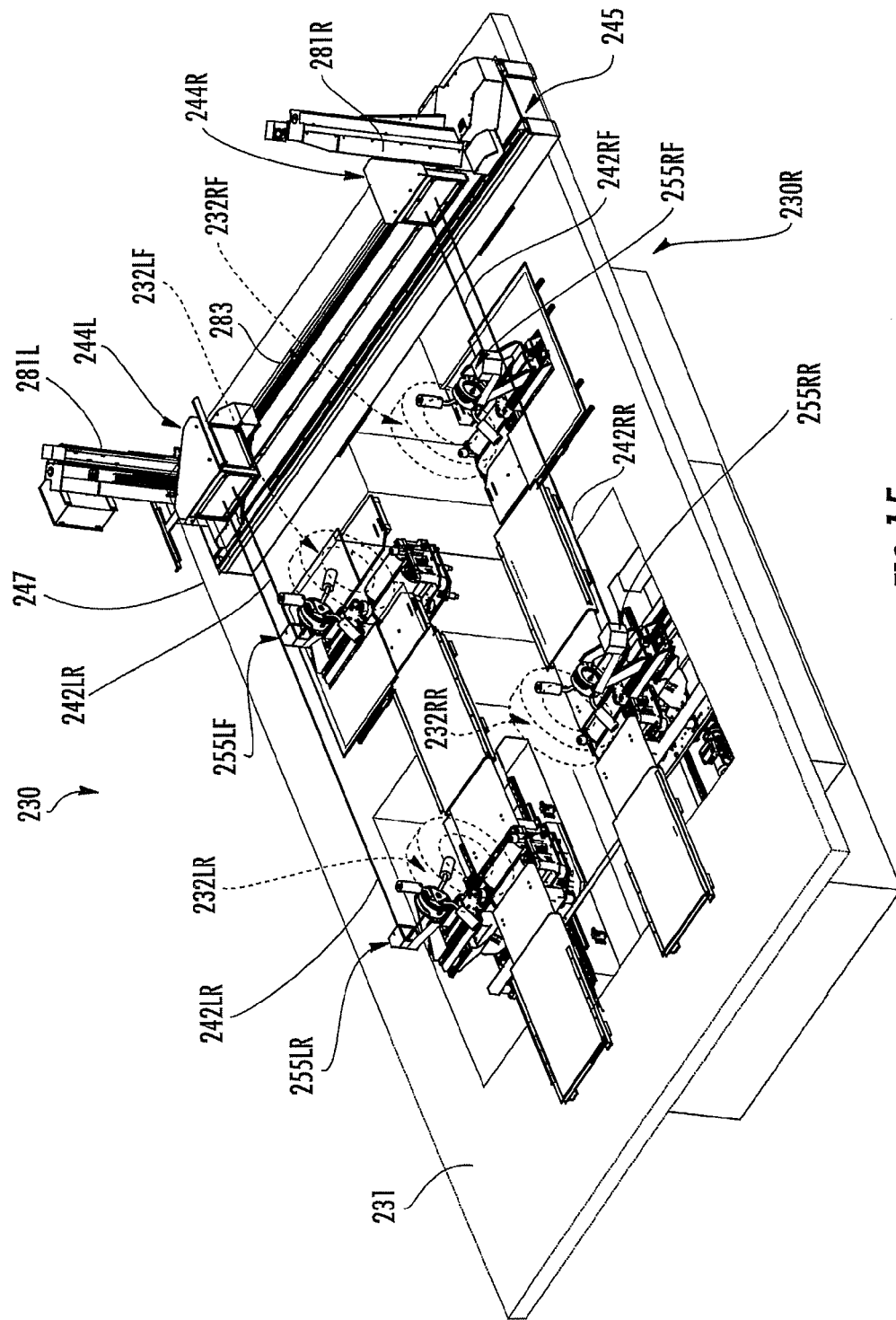
FIG. 15 is a perspective view of an alternative embodiment of a four wheel alignment measurement apparatus in accordance with the present invention having two light receiving assemblies movably positionable at a front location of a vehicle adjustment table.
Figure 16:
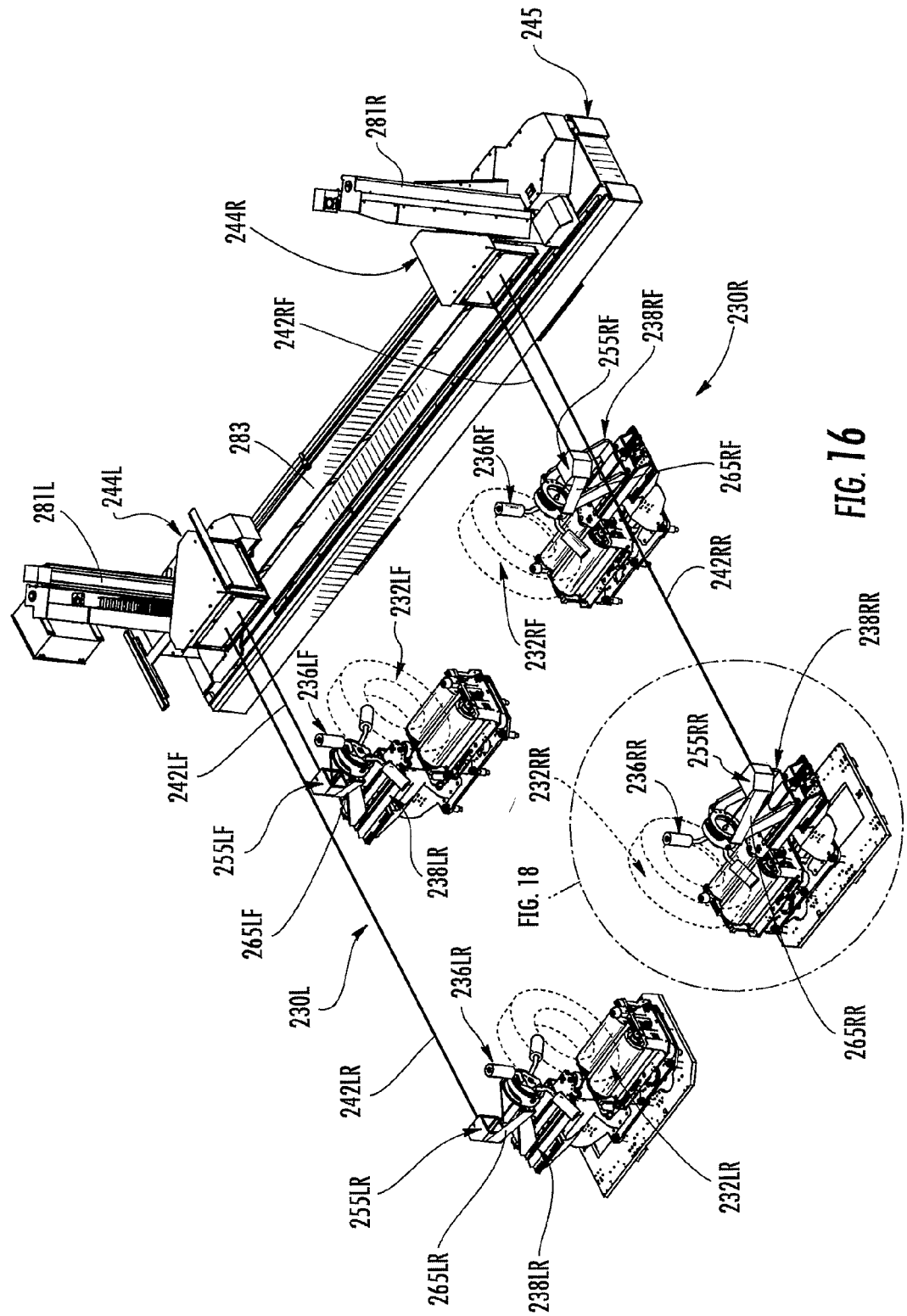
FIG. 16 is a perspective view of the alignment measurement apparatus of FIG. 15 shown removed from the vehicle adjustment table.

Referring now to FIGS. 15-21, and particularly to FIGS. 15 and 16, another alternative four wheel alignment measurement apparatus is illustrated having a left and a right wheel alignment measurement apparatus 230L, 230R. The left wheel alignment measurement apparatus 230L is adapted to measure alignment characteristics of both the left front wheel 232LF and rear wheel 232LR using a single light beam receiving assembly 244L. Correspondingly, the right wheel alignment measurement apparatus 230R is adapted to measure alignment characteristics of both the right front wheel 232RF and rear wheel 232RR using a single light beam receiving assembly 244R. Light beam receiving assemblies 244L, 244R are mounted to an adjustable receiving assembly moving apparatus, which in the embodiment shown is an adjustable frame 245. Frame 245 is located at the forward end 247 of vehicle adjustment table 231 whereat the front end of a vehicle is directed or located when the vehicle is positioned on the adjustment table 231. As such, light beam receiving assemblies 244L, 244R may also be used to measure alignment characteristics of left and right headlamps of a vehicle positioned on vehicle adjustment table 231.

Left wheel alignment measurement apparatus 230L includes, in addition to light beam receiving assembly 244L, a left front contact assembly 236LF mounted to a left front positioning assembly 238LF, and a left light source (not shown) mounted to the left front contact assembly 236LF. A left front reflector or reflective member 255LF is also mounted to the left front positioning assembly 238LF. Left wheel alignment measurement apparatus 230L further includes a left rear contact assembly 236LR mounted to a left rear positioning assembly 238LR, and a left rear light source (not shown) mounted to the left rear contact assembly 236LR. A left rear reflector or reflective member 255LR is also mounted to the left rear positioning assembly 238LR. As described in more detail below, reflector members 255 receive light beams 242 projected from light sources 240 and reflect light beams 242 at an angle toward light beam receiving assemblies 244.

Right wheel alignment measurement apparatus 230R incorporating light beam receiving assembly 244R is of mirror construction to left wheel alignment measurement apparatus 230L, with the components of apparatus 230R marked with the reference suffixes RF and RR that correspond to the LF and LR suffix components, respectively, of left wheel alignment measurement apparatus 230L. Due to the substantial similarity between left and right wheel alignment measurement apparatuses 230L, 230R, the following discussion will focus on the components of right wheel alignment measurement apparatus 230R, unless otherwise noted. It should be appreciated that the description applies equally to both left and right apparatuses 230L, 230R.

Moreover, the contact assemblies 236, positioning assemblies 238, light sources 240, and light beam receiving assemblies 244 are of generally similar construction to wheel alignment measurement apparatus 30 of FIGS. 1-10, with one difference being the employment of reflector boxes 255. As such, the generally similar components of wheel alignment measurement apparatus 230 of FIGS. 15-21 to wheel alignment measurement apparatus 30 are identified with like reference numerals, but with 200 added to the reference numerals used in connection with wheel alignment measurement apparatus 30. In addition, due to the addition of reflector boxes 255 certain other components are identified with LR and RR, as generally indicated above. Due to the similarities with wheel alignment measurement apparatus 30, not all of the characteristics and features of generally like components will be addressed in the following discussion relative to FIGS. 15-21.

As understood from FIG. 16, reflector member 255RR is mounted to be positioned further away from contact assembly 236RR as compared to reflector member 255RF relative to contact assembly 236RF. Thus, the light beam 242RR reflected from reflector member 255RR may pass to the side of reflector member 255RF in order to impinge upon light beam receiving assembly 244R. In the illustrated embodiment, light beam receiving assembly 244R is able to receive light beams 242RR, 242RF without being repositioned horizontally. Alternatively, light beam receiving assembly 244R may be positioned in a first orientation to receive the light beam 242RF from reflector member 255RF and subsequently repositioned to receive the light beam 242RR from reflector member 255RR.

Still further, instead of a light beam from a rear reflector member passing to the side of the front reflector member of the same side as shown and described above, a rear reflector member may be constructed or mounted to pass the light beam from the rear reflector member either above or below the front reflector member of the same side. It should be appreciated that the front and rear reflector members may be positioned or oriented in any manner in which to enable the respective light beams to impinge the light receiving assembly. Furthermore, in the embodiment incorporating a Fresnel lens on the light receiving assembly in which the light beams from both the front and rear reflector members of a given side are simultaneously received by the light receiving assembly, one of the light beams, such as the rear reflected light beam, may be advantageously directed into the light receiving assembly at an angle relative to the other light beam. Such an angled orientation can aid in inhibiting or limiting overlap of the two images impinged on the target by the front and rear reflected light beams.

In operation, alignment characteristics of either the front or the rear wheel assemblies 232RF, 232RR are initially determined. Subsequently, the alignment characteristics of the other of the front or the rear wheel assemblies 232RF, 232RR are determined such that light beam receiving assembly 244R does not simultaneously receive both projected and reflected light beams 242RF, 242RR. However, in an alternative embodiment the light receiving assembly may simultaneously receive both projected light beams. In such an embodiment light beam receiving assembly may be able to distinguish the projected light beam, such as by differences in color or projected location on the internal target. It should be appreciated that the alignment characteristics of the opposite side wheels may be simultaneously determined in like manner during such processes.

As previously noted, light beam receiving assemblies 244R, 244L are mounted to frame 245. In the illustrated embodiment, left light beam receiving assembly 244L is affixed to a left column or left shaft 281L and right light beam receiving assembly 244R is affixed to a right column or right shaft 281R. Light beam receiving assemblies 244L, 244R are vertically positionable along columns 281L, 281R. Columns 281L, 281R are mounted to platform 283, with columns 281L, 281R being horizontally slidable or positionable along platform 283. Frame 245 thus enables light beam receiving assemblies 244L, 244R to be vertically and horizontally displaced such that light receiving assemblies 244L, 244R may be positioned for receiving light beams 242 or for receiving light projected from a headlamp for aligning of the vehicle headlamps.

Figure 17B:
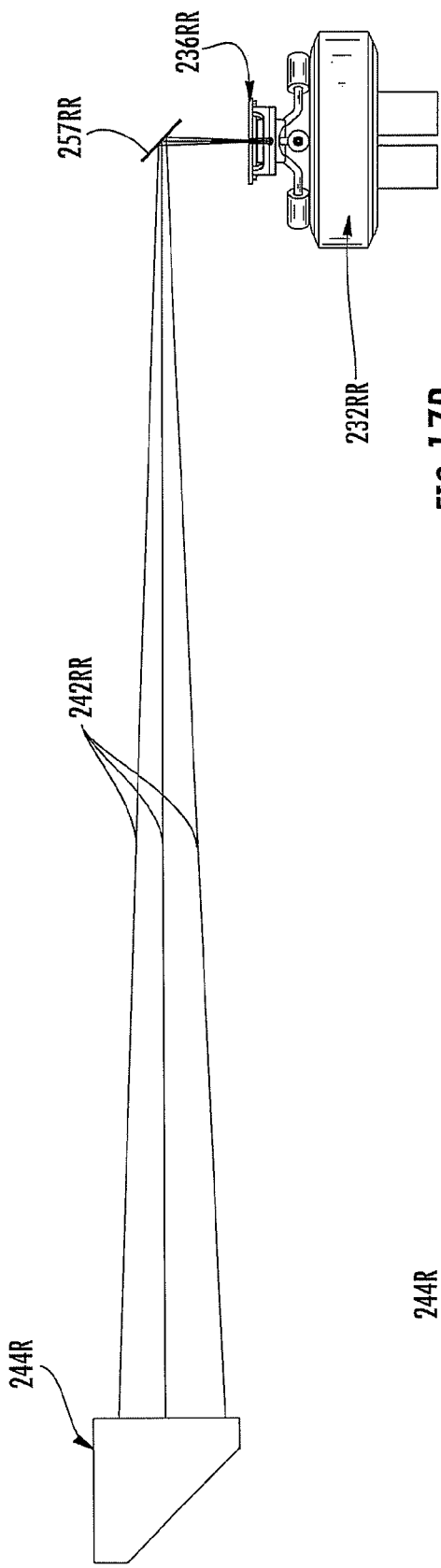
FIG. 17B is a partial top plan view of the passenger side rear wheel assembly of a vehicle in relation to the right rear alignment measurement apparatus of FIG. 16.
Figure 17A:
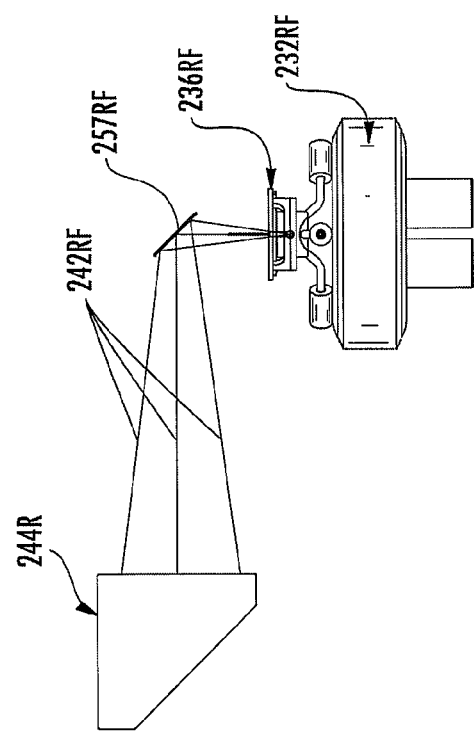
FIG. 17A is a partial top plan view of the passenger side front wheel assembly of a vehicle in relation to the right front alignment measurement apparatus of FIG. 16.

Referring now to FIGS. 17A and 17B: FIG. 17A discloses the inside angled reflecting plate or reflecting mirror 257RF of reflector member 255RF relative to contact assembly 236RF and light receiving assembly 244R. FIG. 17B discloses the inside angled reflecting plate or reflecting mirror 257RR of reflector member 255RR relative to contact assembly 236RR and light receiving assembly 244R. As illustrated, light beams 242RF and 242RR may be projected at various angles from light sources 240RF, 240RR when contact assemblies 236RF, 236RR are oriented to wheel assemblies 232RF, 232RR, and subsequently reflected at different angles from reflecting plates 257RF, 257RR to light beam receiving assembly 244R. FIGS. 17A and 17B illustrate wheel assemblies 232 in a perfectly normal orientation relative to contact assemblies 236. It should be appreciated that it is the deviation of the plane defined by wheel assemblies 232 (not shown in FIGS. 17A and 17B) that causes light beams to be projected at the various angles shown in FIGS. 17A and 17B.

Reflecting plates 257RF, 257RR are sized and angled, in part, based on the anticipated amount of deviation in the alignment orientation of wheel assemblies 232RF, 232RR as contact assemblies 236RF, 236RR are placed there against, as well as based on the size of light beam receiving assembly 244R and the distance between reflecting plates 257RF, 257RR and light beam receiving assembly 244R. Under some situations the misalignment of a wheel assembly 232 may be sufficiently deviated from normal such that the projected light beam 242 reflected from the reflecting plate 257 of a reflector member 255 does not impinge upon the light beam receiving assembly 244. In such cases it may be necessary to perform a pre-orientation step whereby the orientation of the wheel assembly 232 is adjusted until the light beam 242 is detected within the light beam receiving assembly 244. Alternatively, if the misalignment is from an improper assembly of the vehicle, the non-detection of the impingement may direct an operator to further inspect the assembly of the vehicle.

In the illustrated embodiment, reflecting plates 257 are front surface mirrors, such as polished carbide plates. With reference to reflector member 255RR of FIG. 18 and reflector member LR of FIG. 19, each reflector member 255 includes a reflecting plate 257 mounted to the angled wall 259 of reflector member 255 on the interior of the reflector member 255. Reflector member 255 further includes an entrance aperture 261 and an exit aperture 263 (FIG. 19). Apertures 261, 263 may be open or include a transparent or translucent cover plate or lens or the like. As shown, reflector members 255 are adapted to reflect an incoming light beam 242 approximately at right angles. It should be appreciated, however, that systems could employ alternative reflector boxes to reflect light beams at other angles, or even include multiple reflector members to redirect a light beam over multiple paths. Still further, an alternative reflector box may include multi-faceted reflecting plates for receiving and reflecting light beams over narrower angles.

Figure 18:
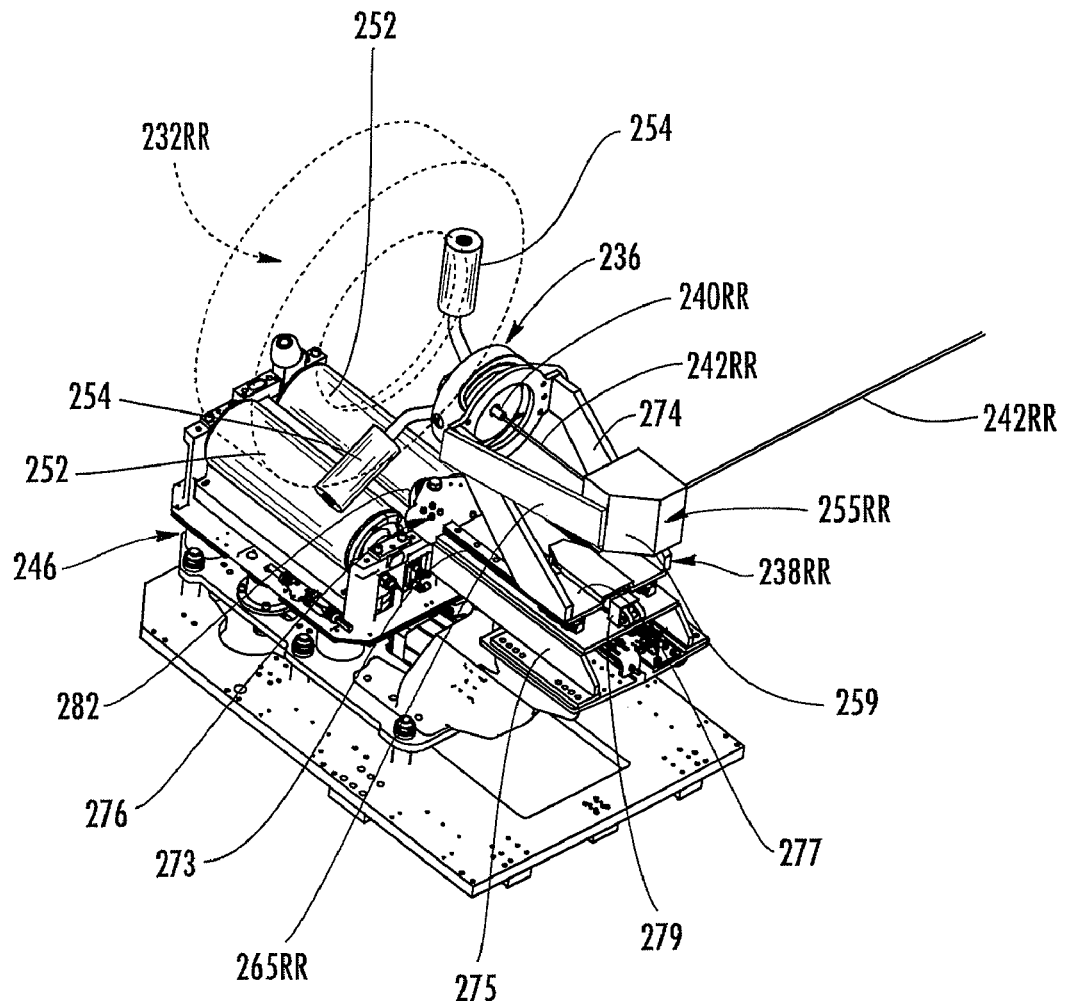
FIG. 18 is a perspective view of one of the wheel alignment measurement apparatuses of FIG. 15.
Figure 19:
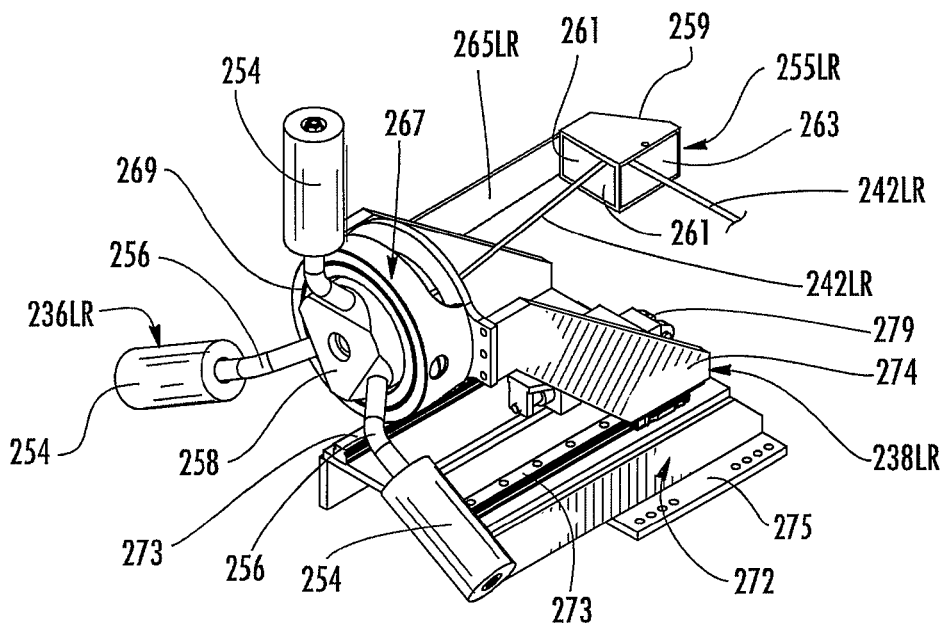
FIG. 19 is a partial perspective view of one of the wheel alignment measurement apparatuses of FIG. 15 from the side opposite that of FIG. 18.

FIG. 18 discloses a close up perspective view of the right rear contact assembly 236RR, right rear positioning assembly 238RR, and right rear light source 240RR of wheel alignment measurement apparatus 230R in relation to tire and wheel assembly 232RR located on powered drums 252 of vehicle support structure 246. As shown, reflector member 255RR is mounted or affixed to positioning assembly 238RR by brace or arm 265RR. Brace 265RR is sized larger than the brace 265RF (FIG. 15) affixing reflector member 255RF to right front positioning assembly 238RF such that reflector member 255RR is positioned a greater distance from light source 240RR than the distance reflector member 255RF is positioned from light source 240RF. This enables light beam 242RR reflected from reflector member 255RR to pass to the outside of reflector member 255RF and impinge upon light beam receiving assembly 244R. As noted, a light beam, such as light beam 242RR reflected from reflector member 255RR, may be alternatively oriented to reflect above, below, or at another alternative orientation to avoid being blocked.

Figure 20:
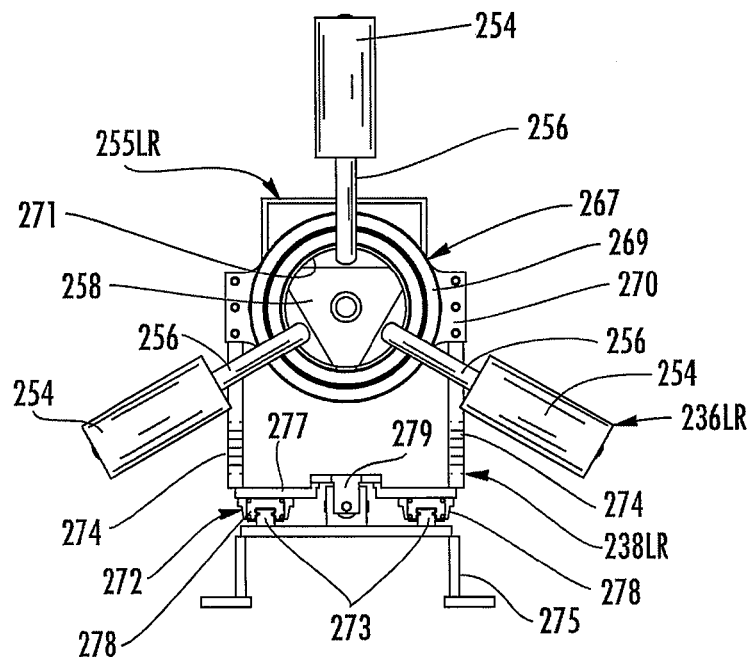
FIG. 20 is a front elevation view of the wheel alignment measurement apparatus components of FIG. 19.
Figure 21:
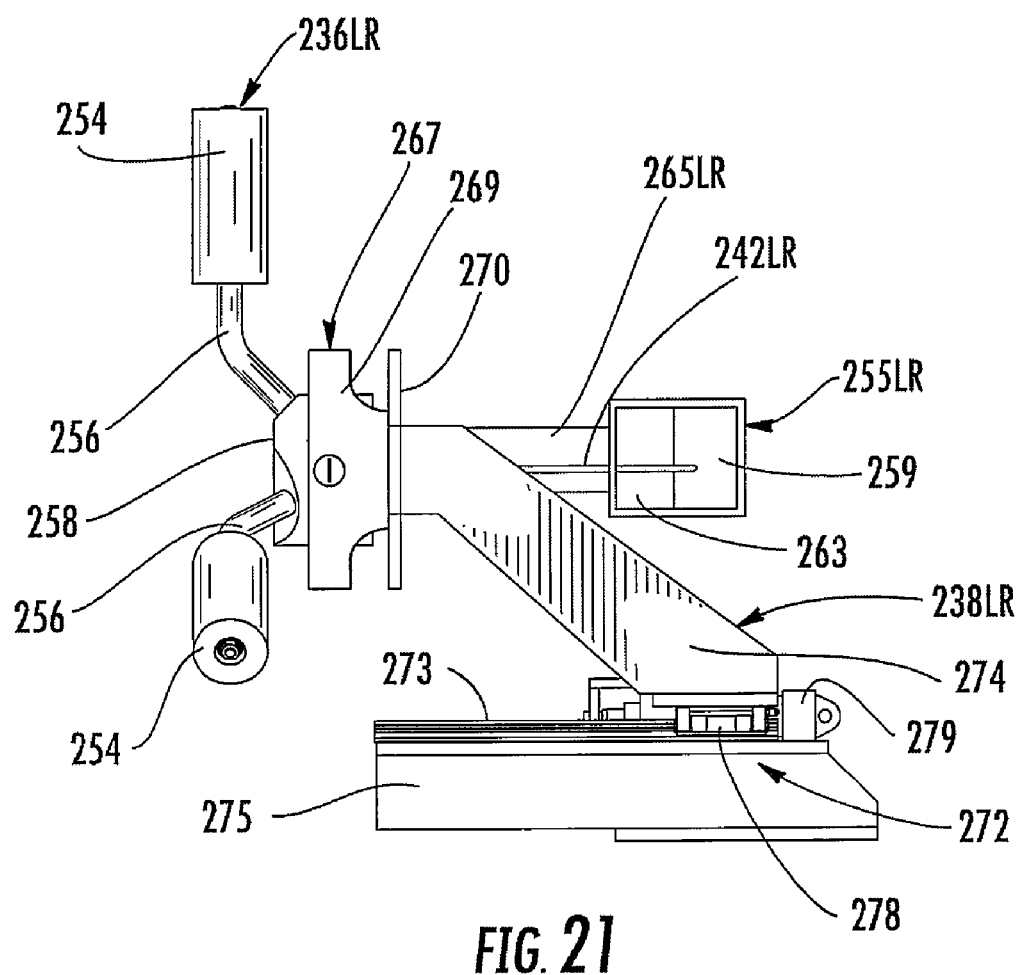
FIG. 21 is a side elevation view of the wheel alignment measurement apparatus components of FIG. 19.

FIGS. 19-21 illustrate the left rear contact assembly 236LR and a portion of the left rear positioning assembly 238LR of wheel alignment measurement apparatus 230L, as well as discloses the interaction of light beam 242LR with reflector member 255LR. Left rear contact assembly 236LR includes rollers 254 mounted to support arms 256, which in turn are mounted to hub 258. Hub 258 is mounted within a pivot, which in the embodiment shown is a bearing assembly 267 that enables hub 258 to float or move in a multi-axis fashion to find the plane of a wheel assembly 232 against which rollers 254 contact. In the illustrated embodiment, bearing assembly 267 is a universal bearing and includes an outer ring 269 and an inner ring 271, with hub 258 mounted within inner ring 271.

Rollers 254 are elongated relative to rollers 54 discussed above such that rollers 254 are useable with multiple sized wheel assemblies without adjusting the position of rollers 254 on arms 256. Rollers 254 typically will contact the outwardly bulging sidewall of a wheel assembly that effectively establishes the highpoint of the wheel assembly. Arms 256 are formed as angled tubes to position rollers 254 away from hub 258. As understood from FIG. 21, rollers 254 are positioned by arms 256 to define a plane.

Positioning assembly 238LR includes a mount 270 to which bearing assembly 267 is attached and further includes a locating assembly 272 having a pair of slides 273 affixed to the top of a base 275. Two brackets or arms 274 extending from a slide plate 277 are affixed to mount 270, with slide plate 277 in turn being slidably secured to the slides 273 of base 275 by channels or bearing blocks 278 affixed to slide plate 277. A drive mechanism 276 including a centering roller 282 (FIG. 18), similar to drive mechanism 76 above, is used to move positioning assembly 238LR toward and away from a wheel assembly 232 in the manner described below. Centering roller 282 is adapted to contact the wheel assembly 232 sidewalls for use in positioning or maintaining the position of the vehicle relative to the powered drums 252. A conventional centering mechanism (not shown) may be used to control drive mechanism 276 and maintain the vehicle centered on the vehicle adjustment table.

Drive mechanism 276 is connected through base 275 to a biasing member 279 secured to the slide plate 277. Thus, when drive mechanism 276 is caused to extend and retract, positioning assembly 238LR is caused to correspondingly extend and retract with base 275 remaining stationary. Movement of drive mechanism 276 toward a wheel assembly 232 causes both centering roller 282 and rollers 254 of contact assembly 238LR to engage a tire side wall. Biasing member 279, however, provides spring like compliance to the positioning assembly 238LR such that contact assembly 238LR is provided with play via the ability to deflect on a limited basis relative to drive mechanism 276. Biasing member 239 may be constructed as a pneumatic spring, coil spring, or the like, and provides independent compliance to the contact assembly 238LR relative to the locating assembly 272 of positioning assembly 238LR. That is, vibrations or movements imparted to the contact assembly 238LR by a wheel assembly 232 will be absorbed by biasing member 239 while inhibiting transmission of movements from or to drive mechanism 276. Contact assembly 238LR is, thus, isolated to determine the plane of a wheel assembly 232. In the illustrated embodiment, rollers 254 of contact assembly 238LR are adapted to contact a tire sidewall prior to centering roller 282 of drive mechanism 276 contacting the tire sidewall. The deflection of biasing member 279 then enables centering roller 282 to engage the sidewall while also imparting a biasing force maintaining the engagement of the rollers 254 to the sidewall.

The present invention provides significant advantages over prior known apparatus and methods for measuring and calculating the orientation of three-dimensional objects such as vehicle wheels for alignment purposes. The invention allows rapid and efficient contact with the object such as the rotating vehicle wheel/tire without precise alignment of the center of the contact assembly with the vehicle axle, and is readily adjustable to fit various sizes of vehicle wheels and tires. When directed to the receiving assembly, the light beam provides a direct indication of the plane of the vehicle wheel/tire on a target to indicate the location of the plane of the object or vehicle wheel/tire, and provide a direct indication of the toe and camber settings for the wheel and tire. The image on the target may be viewed by an image sensor such as a charge-coupled display (CCD) camera to translate the image to toe and/or camber values and allow adjustment and setting of the object position such as the alignment of the vehicle wheel. The image may alternatively be viewed directly from the target such that a camera need not be employed, thus further reducing the complexity of the system. The apparatus and method allow rapid determination of the position of the wheel/tire with minimal operator labor using an apparatus that is less costly to manufacture and use and not subject to significant wear during use.

Changes and modifications in the specifically described embodiments can be carried out without departing from the principles of the present invention which is intended to be limited only by the scope of the appended claims, as interpreted according to the principles of patent law including the doctrine of equivalents.

The embodiments in which an exclusive property or privilege is claimed are as follows:

1. Apparatus for determining the orientation of a wheel assembly having a tire mounted on a wheel rim secured for rotation on an axle of a vehicle, said apparatus comprising:
   a contact assembly for engaging the wheel assembly by pressing against the wheel assembly without being secured thereto to define a plane of orientation of the wheel assembly;
   a light source for projecting a beam of light with respect to said contact assembly; and
   a light beam receiving assembly for receiving said light beam and forming an image of said light beam indicating the orientation of the wheel assembly with respect to a predetermined position, said light beam being directed from said contact assembly to said receiving assembly, said receiving assembly including a target and a lens, said lens adapted to direct said light beam to said target, wherein the location at which said light beam impinges upon said target is indicative of the planar orientation of the wheel assembly.

2. The apparatus of claim 1, wherein said lens of said light beam receiving assembly is a converging lens.

3. The apparatus of claim 2, wherein said lens is a Fresnel lens.

4. The apparatus of claim 1, wherein said light beam receiving assembly includes a light detector, said light detector adapted to image impingement of said light beam on said target and provide information indicative of the planar orientation of the wheel assembly.

5. The apparatus of claim 4, wherein said light detector is a charge-coupled device.

6. The apparatus of claim 1, wherein said contact assembly includes a plurality of contact members wherein said contact members engage the wheel assembly at a plurality of spaced areas on the wheel assembly, each contact member being mounted on a support and adapted to engage the sidewall of the tire while the wheel assembly is rotating on the axle such that said light beam forms an image of the orientation of the wheel assembly on said target.

7. The apparatus of claim 6 including a positioning assembly having a mount, and wherein said contact assembly includes a pivot for pivotally securing said contact assembly to said mount, said apparatus further including a locating assembly adapted to move said contact assembly relative to the wheel assembly for selectively engaging and disengaging said contact members with the wheel assembly.

8. The apparatus of claim 1, wherein said light source is a laser.

9. The apparatus of claim 1, wherein said light source is mounted on said contact assembly.

10. The apparatus of claim 1 wherein the vehicle is of the type having four wheels including a pair of front wheels and a pair of rear wheels; wherein a pair of said apparatuses are positioned adjacent at least one of (a) the front wheels and (b) the rear wheels, and wherein each said apparatus includes a centering roller for positioning the vehicle relative to said apparatuses.

11. The apparatus of claim 1, further including a second contact assembly for engaging a second wheel assembly of the vehicle to define a plane of orientation of the second wheel assembly;
   a second light source for projecting a second beam of light with respect to said second contact assembly;
   wherein said light beam receiving assembly is adapted to receive both said light beams and form images of both said light beams on said target indicative of the planar orientation of both said wheel assemblies.

12. The apparatus of claim 11, wherein said light beam receiving assembly is further adapted to receive a projected light beam from a headlamp of the vehicle, said light beam receiving assembly forming an image of said headlamp light beam on said target, wherein the location at which said headlamp light beam impinges upon said target is indicative of the alignment of the headlamp.

13. The apparatus of claim 12, wherein said light beam receiving assembly is placed in a first position for receiving said light beam with respect to said contact assembly and is placed in a second position for receiving said headlamp light beam.

14. Apparatus for determining the orientation of a wheel assembly having a tire mounted on a wheel rim secured for rotation on an axle of a vehicle, said apparatus comprising:
   a contact assembly for engaging the wheel assembly to define a plane of orientation of the wheel assembly;
   a light source for projecting a beam of light with respect to said contact assembly; and
   a light beam receiving assembly for receiving said light beam and forming an image of said light beam indicating the orientation of the wheel assembly with respect to a predetermined position, said light beam being directed from said contact assembly to said receiving assembly, said receiving assembly including a target and a Fresnel lens, said lens adapted to direct said light beam to said target, said light beam receiving assembly further including a camera device for imaging said target, said camera device adapted to provide toe and camber information of the wheel assembly based on the location at which said light beam impinges upon said target.

15. The apparatus of claim 14 further including a second contact assembly for engaging a second wheel assembly of the vehicle to define a plane of orientation of the second wheel assembly;
   a second light source for projecting a second beam of light with respect to said second contact assembly;
   wherein said light beam receiving assembly is adapted to receive both said light beams and form images of both said light beams on said target, said camera device adapted to provide toe and camber information of both wheel assemblies based on the location at which said light beams impinge upon said target.

16. The apparatus of claim 14, wherein said light beam receiving assembly is further adapted to receive a projected light beam from a headlamp of the vehicle, said light beam receiving assembly forming an image of said headlamp light beam on said target, wherein the location at which said headlamp light beam impinges upon said target is indicative of the alignment of the headlamp.

17. The apparatus of claim 16, wherein said light beam receiving assembly is placed in a first position for receiving said light beam with respect to said contact assembly and is placed in a second position for receiving said headlamp light beam.

18. A method for determining the alignment position of a vehicle wheel comprising:
    engaging the wheel with a contact assembly to define a plane of orientation of the wheel;
    projecting a beam of light with respect to the contact assembly;
    receiving the light beam and forming an image of the light beam with a receiving assembly, including directing the light beam from the contact assembly to the receiving assembly, and directing the light beam to a target with a lens; and
    determining the orientation of the wheel with respect to the vehicle centerline based on the impingement location of the light beam on the target.

19. The method of claim 18, including imaging the impingement of the light beam on the target with a camera device and providing information indicative of the planar orientation of the wheel with the camera device.

20. The method of claim 18, wherein said directing the light beam to a target with a lens comprises directing the light beam to a target with a Fresnel lens.

21. The method of claim 18, including projecting a light beam from a headlamp, receiving the headlamp light beam with the receiving assembly, and determining the alignment of the headlamp with respect to the vehicle.

22. The method of claim 21, further including positioning the receiving assembly in a first position to receive the light beam projected with respect to the contact assembly, and positioning the receiving assembly in a second position to receive the headlamp light beam projected from a headlamp.

23. The method of claim 18, further including:
    engaging a second wheel with a second contact assembly to define a plane of orientation of the second wheel;
    projecting a second beam of light with respect to the second contact assembly;
    receiving the second light beam and forming an image of the second light beam with the receiving assembly, including directing the second light beam from the second contact assembly to the receiving assembly, and directing the second light beam to the target with the lens; and
    determining the orientation of both wheels with respect to the vehicle centerline based on the impingement locations of the light beams on the target.

* * * * *